US012646172B2

(12) United States Patent
Mullaney

(10) Patent No.: US 12,646,172 B2
(45) Date of Patent: Jun. 2, 2026

(54) TWO-DIMENSIONAL IMAGE REGISTRATION METHODS AND SYSTEMS FOR THREE-DIMENSIONAL OBJECT TRANSFORMATION

(71) Applicant: Arthrex, Inc., Naples, FL (US)

(72) Inventor: Michael W. Mullaney, Naples, FL (US)

(73) Assignee: Arthrex, Inc., Naples, FL (US)

( * ) Notice: Subject to any disclaimer, the term of this patent is extended or adjusted under 35 U.S.C. 154(b) by 233 days.

(21) Appl. No.: 18/688,191

(22) PCT Filed: Sep. 2, 2022

(86) PCT No.: PCT/US2022/042561
§ 371 (c)(1),
(2) Date: Feb. 29, 2024

(87) PCT Pub. No.: WO2023/034620
PCT Pub. Date: Mar. 9, 2023

(65) Prior Publication Data

US 2024/0404052 A1 Dec. 5, 2024

Related U.S. Application Data

(60) Provisional application No. 63/240,167, filed on Sep. 2, 2021.

(51) Int. Cl.
*G06T 7/73* (2017.01)
*G06T 7/00* (2017.01)

(52) U.S. Cl.
CPC .............. *G06T 7/0012* (2013.01); *G06T 7/75* (2017.01); *G06T 2207/10116* (2013.01); *G06T 2207/30008* (2013.01); *G06T 2207/30204* (2013.01)

(58) Field of Classification Search
None
See application file for complete search history.

(56) References Cited

U.S. PATENT DOCUMENTS

2015/0327795 A1 11/2015 Alexander et al.
2016/0350921 A1 12/2016 Bataller et al.
2017/0119339 A1 5/2017 Johnson et al.
(Continued)

FOREIGN PATENT DOCUMENTS

WO 2020186066 A1 9/2020

OTHER PUBLICATIONS

Han, R.—"A fast fiducial marker tracking model for fully automatic alignment in electron tomography"—Bioinformatics 2018, pp. 853-863 (Year: 2018).*
(Continued)

*Primary Examiner* — Bernard Krasnic
(74) *Attorney, Agent, or Firm* — Price Heneveld LLP

(57) ABSTRACT

Methods, systems and computer program products of constructing a transform that registers a two-dimensional (2D) image and a three-dimensional (3D) device depicted in the image. The methods include determining a best pitch, spin and x-y-z positions of a 3D mathematical device model as compared to the device depicted in a first obtained 2D image, determining a best x-y-z position of a focal point as compared to the device depicted in the first image, and, based thereon, constructing a transform that registers the first image and the device.

18 Claims, 14 Drawing Sheets

(56) References Cited

U.S. PATENT DOCUMENTS

| | | | | |
|---|---|---|---|---|
| 2019/0247130 | A1 | 8/2019 | State et al. | |
| 2021/0166424 | A1* | 6/2021 | Mullaney | G06T 17/00 |

OTHER PUBLICATIONS

"Geometry Calibration Phantom Design for 3D Imaging" http://proceedings.spiedigitallibrary.org SPIE vol. 6142, Aug. 18, 2013.

"A Versatile Camera Calibration Technique for High-Accuracy 3D Machine Vision Metrology Using Off-the-Shelf TV Cameras and Lenses" IEEE Journal of Robotics and Automation, vol. RA-3, No. 4, Aug. 1987.

"An Analytic Solution for the Perspective 4-Point Problem" Horaud et al., 1989 IEEE, pp. 500-507.

* cited by examiner

100

101    OBTAIN A DIGITAL 2D IMAGE OF A DEVICE (E.G., AN EXTERNAL FIXATION DEVICE) WITH AT LEAST FOUR NON-COPLANAR UNIQUE INDENTIFIABLE ARTIFACTS (FIDUCIALS)

102    ROTATE THE IMAGE ABOUT AN AXIS NORMAL TO THE PLANE OF THE IMAGE SUCH THAT A REFERENCE ARTIFACT OF THE DEVICE IN THE IMAGE (E.G., A SUPERIOR OR INFERIOR ASPECT/PLATFORM) IS ORIENTED HORIZONTAL IN THE IMAGE PLANE

103    OBTAIN PHYSICAL PARAMETERS OF THE DEVICE THAT ARE SUFFICIENT TO CREATE A VIRTUAL (MATHEMATICAL) MODEL

104    CONSTRUCT A MODEL (MATHEMATICAL) OF THE DEVICE BASED ON THE OBTAINED PHYSICAL PARAMETERS

105    CREATE A BOUNDED AREA OF INTEREST ON EACH OBTAINED IMAGE THAT DEFINES AN AREA THAT CONTAINS DEPICTIONS OF THE AT LEAST FOUR IDENTIFIABLE FIDUCIALS

106    IDENTIFY THE DEPICTIONS OF THE AT LEAST FOUR IDENTIFIABLE FIDUCIALS IN THE BOUNDED AREA OF INTEREST IN THE FIRST IMAGE, AND ASSIGN EACH DEPICTED FIDUCIAL A RESPECTIVE REFERENCE LABEL

107    DETERMINE A PLURALITY OF METRICS REGARDING THE POSITION AND TRAJECTORY OF THE DEPICTIONS OF THE AT LEAST FOUR FIDUCIALS IN THE IMAGE WITHIN THE BOUNDED AREA OF INTEREST

108    CREATE A MODEL (MATHEMATICAL) OF THE DEVICE ABOVE THE IMAGE IN IMAGE SPACE (IMAGE COORDINATE SYSTEM) BETWEEN THE IMAGE AND A FOCAL POINT (INCLUDES SCALING MODEL TO THE FIDUCIAL DEPICTIONS, AND ORIENTING MODEL WITH NO YAW OR PITCH AND APPROXIMATING ROLL/SPIN BASED ON IMAGE INFORMATION AND APPROXIMATED FOCAL POINT)

150    DETERMINE A BEST PITCH, SPIN AND X-Y-Z POSTIONS OF THE MODEL OF THE DEVICE DETERMINE X-Y-Z POSITION OF THE FOCAL POINT, AND BASED THEREON, CONSTRUCT A TRANSFORM THAT REGISTERS THE OBTAINED IMAGE AND THE DEVICE

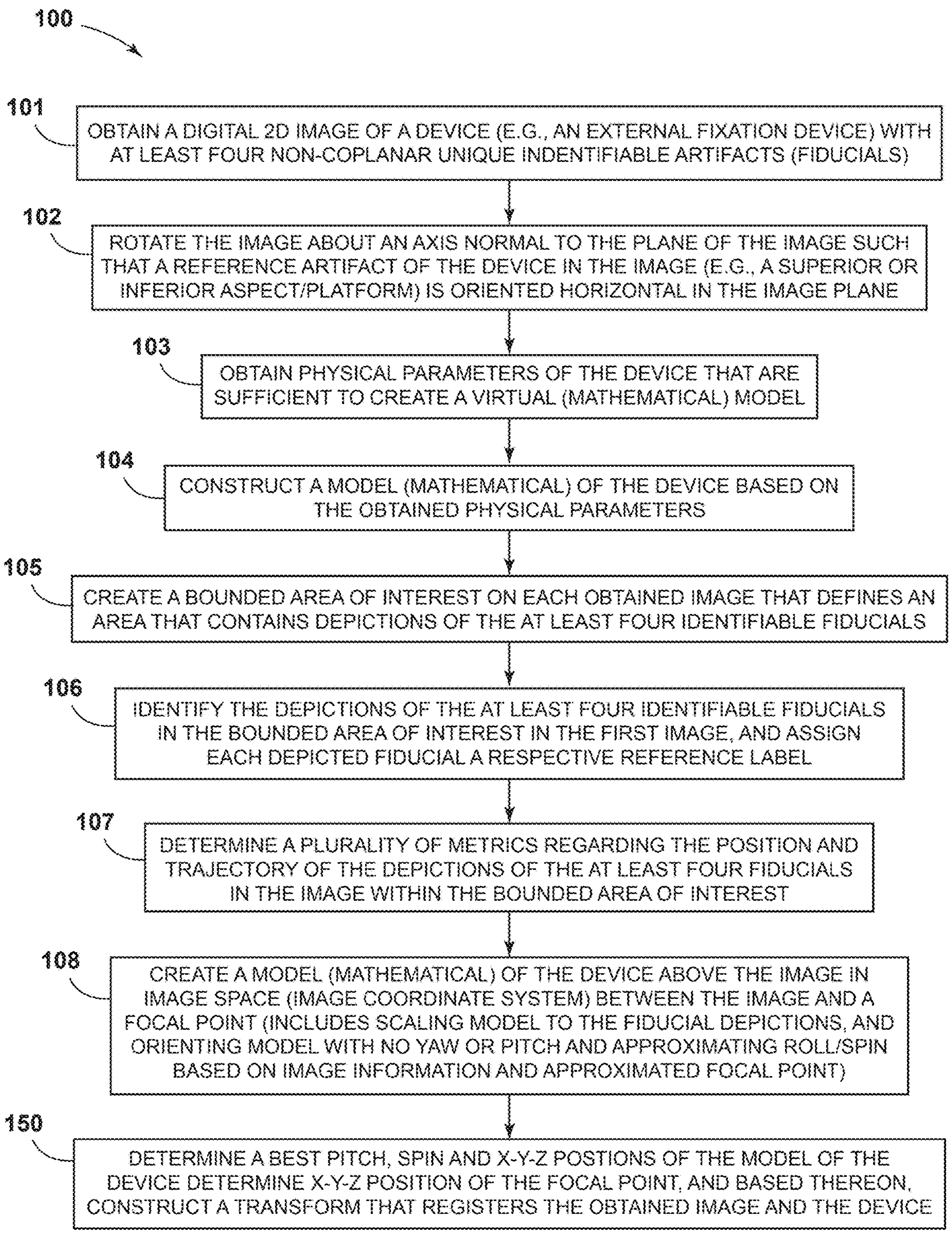

```
for jj = 1:nMugshots
    for ii = 1:nCandidates
        theSet                  = Candidate_sets(ii,:);
      % Model Based Fiducial Shadow Beta
        SS                      = ShadowDataEst,ShadowData(:,:,jj);
        MA                      = SS(5:10,:);
        ang_ctr_model           = SS(11,theSet)';
        model_x_loc             = SS(12,theSet)';
        model_y_loc             = SS(13,theSet)';
        tmp                     = MA(theSet,theSet);
        ang_model               = tmp(do_compare);
        idx                     = ang_model < 0;
        ang_model(idx)          = 180 + ang_model(idx);
        ang_model(~idx)         = 180 - ang_model(~idx);
        Mugshot_score_1         = sum(abs(ang_model - ang_image));
        Mugshot_score_2         = sum(abs(ang_ctr_model - ang_ctr_inage));
        Mugshot_score_3         = sum(abs(model_x_loc - shadow_x_loc))*10;
        Mugshot_score_4         = sum(abs(model_y_loc - shadow_y_loc))*10;
        Mugshot_score(ii,jj)    = (Mugshot_score_1 + Mugshot_score_2 +…
                                    Mugshot_score_3 + Mugshot_score_4)/4;
    end
    [bestScore, bestIdx]        = min(Mugshot_score(:, jj));
    bestSet                     = Candidate_sets(bestIdx,:);
    if Debug
        plot_diamonds(SS, FWwrtImage(:,:,bestIdx),FocalPoint)
        title("Best Score: " + bestScore);
        if bestScore < priorBestScore
            plot_circles(bestSet,ImageData,shadows);
            priorBestScore      = bestScore;
        end
    end
end
```

109 — ITERATIVELY ADJUST THE PITCH AND SPIN OF THE VIRTUAL MODEL AND DETERMINE CORRESPONDING POSITIONS OF DEPECTIONS OF THE FIDUCIALS THEREOF IN THE IMAGE SPACE, AND: 1) DETERMINE PITCH AND SPIN ORIENTATION(S) WHICH PRODUCE FIDUCIAL DEPICTIONS THAT HAVE PLURALITY OF METRICS THAT MOST CLOSELY MATCHES THE DETERMINED METRICS OF THE FIDUCIALS IN THE FIRST IMAGE; AND 2) DETERMINE A REFERENCE LABEL CORRELATION OF THE FIDUCIALS OF THE MODEL THAT HAS THE PLURALITY OF METRICS THAT MOST CLOSELY MATCHES THE DETERMINED METRICS OF THE FIDUCIALS IN THE IMAGE

110 — IN THE DETERMINED BEST PITCH AND SPIN DETERMINATION(S) AND WITH THE BEST REFERENCE LABEL CORRELATION(S), ITERATIVELY ADJUST THE HORIZONTAL AND VERTICAL (X AND Y) POSITION OF THE VIRTUAL MODEL (WITH RESPECT TO FOCAL POINT AND IMAGE PLANE) AND DETERMINE A HORIZONTAL AND VERTICAL POSITION WITH FIDUCIAL DEPICTIONS THAT HAS THE PLURALITY OF METRICS THAT MOST CLOSELY MATCHES THE DETERMINED METRICS OF THE FIDUCIALS IN OBTAINED IMAGE (SKEW ADJUSTMENT)

111 — ORIENTED IN THE DETERMINED BEST PITCH, SPIN AND X-Y POSITION, ITERATIVELY ADJUST THE HEIGHT OF THE VIRTUAL MODEL AND THE FOCAL POINT WITH RESPECT TO THE IMAGE PLANE TO SCALE THE VIRTUAL DEPICTIONS OF THE FIDUCIALS OF THE MODEL THAT BEST MATCHES THAT OF THE FIDUCIAL DEPICTIONS IN THE OBTAINED IMAGE (SCALE ADJUSTMENT)

112 — MOVE VIRTUAL FRAME AND FOCAL POINT IN X AND Y DIRECTIONS TO BEST SUPERIMPOSE THE VIRTUAL DEPICTIONS OF THE FIDUCIALS OF THE MODEL WITH THE FIDUCIAL DEPICTIONS IN THE OBTAINED IMAGE

113 — BASED ON THE DETERMINED BEST PITCH, SPIN AND X-Y-Z POSITIONS OF THE MODEL, AND THE DETERMINED X-Y-Z POSITION OF THE FOCAL POINT, CONSTRUCT A TRANSFORM THAT REGISTERS THE OBTAINED IMAGE AND THE DEVICE MODEL

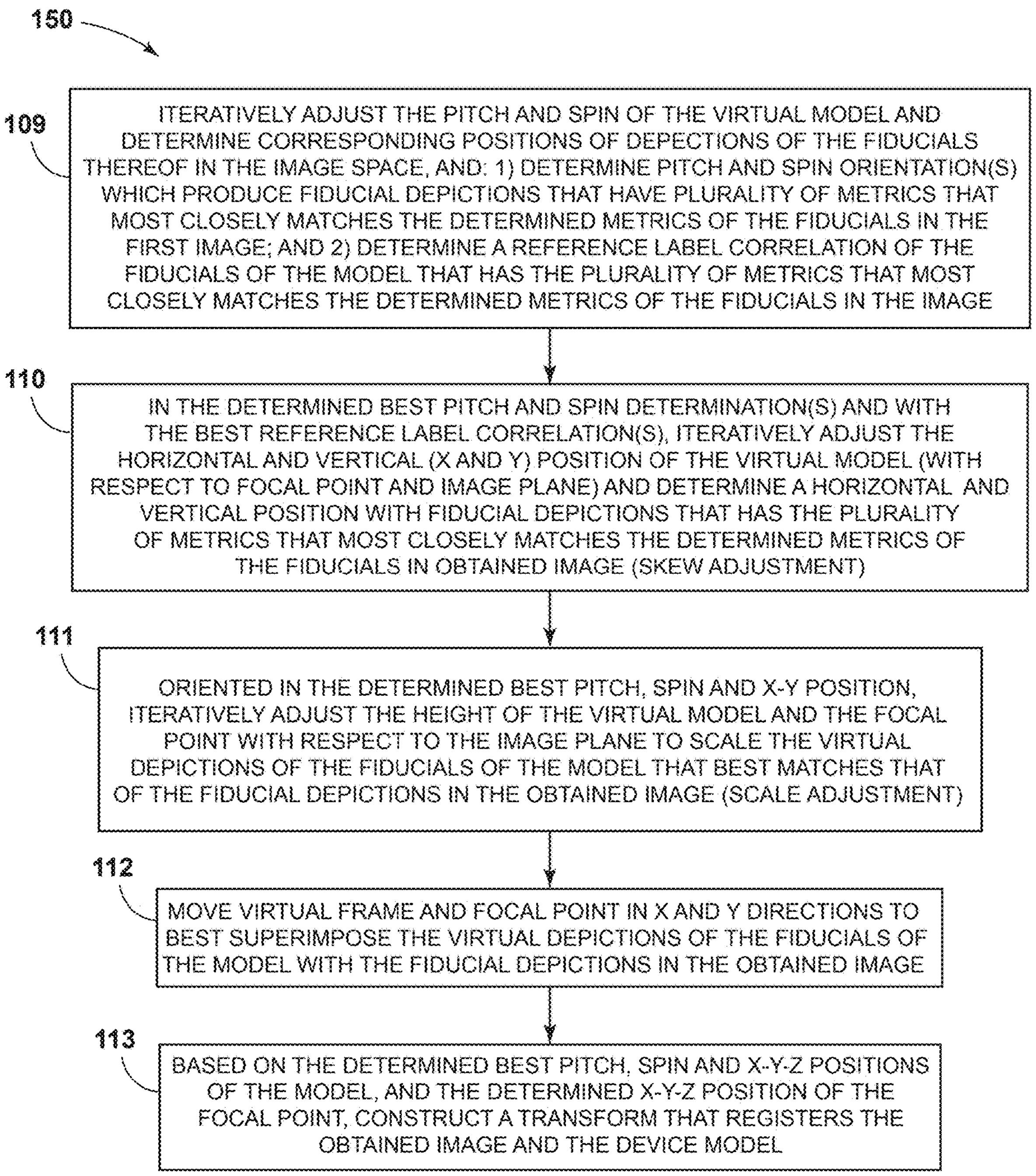

FIG. 10

TWO-DIMENSIONAL IMAGE REGISTRATION METHODS AND SYSTEMS FOR THREE-DIMENSIONAL OBJECT TRANSFORMATION

CROSS-REFERENCE TO RELATED APPLICATION

The present application is a 371 national stage filing of PCT/US2022/042561 which was filed Sep. 2, 2022, and claimed the priority benefit of U.S. Provisional Application No. 63/240,167, entitled Two-Dimensional Image Sequential Determination Methods and Systems for Three-Dimensional Object Transformation, filed on Sep. 2, 2021, the entireties of which are expressly incorporated herein by reference.

FIELD OF THE DISCLOSURE

The present disclosure is generally directed to image registration utilizing a known three-dimensional (3D) construct depicted in an image. More particularly, the present disclosure is directed to image (e.g., radiographic image) and three-dimensional model registration methods and systems that utilize known physical parameters (e.g., separation distances between at least four (4) shapes or points) of a given 3D construct depicted in an image.

The present disclosure also generally relates to systems and methods for deformity analysis using one or more images or radiographs. Embodiments of the disclosure are directed to treating musculoskeletal conditions, including skeletal fractures. More specifically, methods and systems for securing and placing segments of a bone or bones in desired locations are disclosed. In some embodiments of the disclosure, methods and systems are used to generate a three-dimensional computer model of a fixation device, bone segments and potentially at least one (e.g., at least two) radiographic image representations that correspond to radiographic images that were utilized to create the model. Through operations on the model, desired placement of the bone's segments and operation of an external fixation device, in one embodiment, to achieve such desired placement is determined quickly and accurately regardless of the initial configuration of the fixation device or the orientation of the radiographic images relative to the device and/or bones. The operations required to create the desired placement of the bone's segments may then be enacted on the corresponding fixation device and bone segments to treat the musculoskeletal condition. However, other devices other than external fixation devices may be utilized with the system and methods.

BACKGROUND

In medicine, the correction of orthopedic deformities usually involves at a minimum a pair of x-ray radiographs. Typically, these radiographs are taken of the patient along the conventional lines of an anterior to posterior (AP) direction as well as a medial to lateral (ML) direction, or along other orthogonal or known vantage points (or known difference between vantage points). In accordance with convention, the AP and ML radiographs are taken or assumed to be orthogonal to each other in patient space (with patient space being defined as having the X axis aligned from right to left, the Y axis aligned from anterior to posterior, and the Z axis aligned with inferior to superior). Measurements are made, and deformity axes and points are annotated, within each of the pair of radiographs. These measurements and annotations are then used to reconstruct a true 3-dimensional representation of the deformity in order that the deformity can be manipulated by some means to correct the condition.

However, the problem that often arises is due to the uncertainty over the radiographs and their spatial relationship to each other. Radiographs are not perfect images of the artifacts contained within those images. The relationship between the artifacts shown in the image and the actual objects being imaged is one of perspective such that those object that lie closer to the image have a smaller amount of magnification than those that lie further away. In addition, the uncertainty with regard to the orthogonality between the pair of images make the reconstruct of a true representation difficult.

As a result, means by which these uncertainties of such radiographs, due to their actual perspective/vantage point can be accounted for are needed.

Further, in many fields of study, it is often desired to register a two-dimensional (2D) image with a known 3D object. By "registration." it is meant to construct a coordinate transform whereby the position and pose of a 3D object can be determined within a coordinate system coincident with the 2-dimensional image. For example, a 3D coordinate system can be considered coincident with a 2D image when any plane of the 3D coordinate system is coplanar with the 2D image. Registering the 3D object within this coordinate system may enable the creation of one or more virtual environments where the perspective of the viewer can be determined, and the image and object can be properly placed within that environment.

In the field of medicine this is often an important step in the proper placement or manipulation of implants, surgical instruments or body tissue structures. One of the most common methods of imaging is the basic x-ray radiograph, in contrast to 3D imaging techniques such as CT and MRI, which have the benefit of low cost and real time accessibility in the operating environment. It is desirable to be able to register known 3D objects or bodily structures with respect to the real time image on an individual image basis.

Currently, there are methods of registration utilizing multiple images of a given combination of 3D structures. However, in these cases it is necessary to know with some high degree of certainty the spatial relationship between the plurality of images. Some current stereoscopic image guidance systems may be ale accomplish this externally, and typically rely on a known relationship between the pair of cameras being used. Some other current methods typically call for a plurality of images, such as an anterior-posterior (AP) and a medial-lateral (ML) radiograph, to be taken. The relationship between such images is subject to the variables inherent in taking such images which result in errors in the 3D registration, as noted above.

As a specific example, in orthopedics it is often necessary to correct bone deformities with a device known as an external fixator. Such external fixators come in a variety of configurations, such as from simple mono-lateral and pin-to-bar systems, and to more complex circular constructs. In order to accurately correct such bone deformities, one must accurately characterize the spatial relationship between the bone anatomy and the fixator construct once the construct is mounted to the patient. This process of characterization may begin with the taking of a plurality of images, such as two or more 2D radiographs or a 3D image scan of the fixator construct mounted to the bone. Due to the ease and low cost of 2D radiographs, they are the predominant means by which such characterizations are obtained. It is therefore desirable to accurately register each of a plurality of 2-dimensional images on an individual basis of an external fixator, or other known 3D entity, to accurately place other bodily structures relative to the known 3D entity.

While certain aspects of conventional technologies have been discussed to facilitate disclosure of Applicant's inventions, the Applicant in no way disclaims these technical aspects, and it is contemplated that their inventions may encompass one or more conventional technical aspects.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions: or is known to be relevant to an attempt to solve any problem with which this specification is concerned.

SUMMARY

The present inventions may address one or more of the problems and deficiencies of the art. However, it is contemplated that the inventions may prove useful in addressing other problems and deficiencies in a number of technical areas. Therefore, the claimed invention(s) should not necessarily be construed as limited to addressing any of the particular problems or deficiencies discussed herein.

The present disclosure is generally directed to image registration methods and systems that utilize a known three-dimensional (3D) construct depicted in an image. More particularly, the present disclosure is directed to image (e.g., radiographic image) and three-dimensional model registration methods and systems that utilize known physical parameters, such as for example the position of at least four (4) known shapes or points of a given 3D construct depicted man image.

The present disclosure also generally relates to systems and methods for deformity analysis using one or more radiographs taken from unknown (or non-exact or incorrectly identified) vantage points (such as non-orthogonal radiographs). In some embodiments, the systems and methods register each two-dimensional image with a three-dimensional computer model of the known three-dimensional construct (e.g., with known fiducial shape (and size) and locations) depicted in the image, and use each registered image and three-dimensional model as part of a manipulable model for deformity analysis and/or deformity correction and prescription determination.

Some such embodiments of the disclosure are directed to treating musculoskeletal conditions, including skeletal fractures. More specifically, methods and systems for securing and placing segments of a bone or bones in desired locations are disclosed. In some embodiments of the disclosure, methods and systems are used to generate a three-dimensional computer model of a fixation device, bone segments and potentially at least one (e.g., at least two) radiographic image representations that correspond to radiographic images that were utilized to create the model. Through operations on the model, desired placement of the bone's segments and operation of an external fixation device, in one embodiment, to achieve such desired placement is determined quickly and accurately regardless of the initial configuration of the fixation device or the orientation/vantage point of the radiographic images relative to the device and/or bones. The operations required to create the desired placement of the bone's segments may then be enacted on the corresponding fixation device and bone segments to treat the musculoskeletal condition. However, other devices other than external fixation devices may be utilized with the system and methods.

In some embodiments, the present disclose provides methods and related systems that utilize planar locations and characteristics of four discrete shapes or points contained within a given 2-dimensional radiograph to correlate to 4 discrete spatial coordinates contained within a fixator construct (or the construct of another known object). With this information, the methods and related systems obtain an accurate spatial relationship between the fixation construct (or the construct of another known object) and each of the individual radiographs.

In some embodiments, a radiographic image contains the shadows of three-dimensional objects that were posed and located above that image (e.g., film) when taken. The apparent source location and orientation of the x-ray source with respect to the image that is casting that shadow is unknown.

In some embodiments, the system and methods of the present disclosure are configured to determine the spatial relationship between an object and its shadow. Specifically, the system and methods of the present disclosure are configured to determine the position of the object in terms of three translations, and the pose in terms of three rotations in terms of an orthogonal 3-dimensional (3D) coordinate system. The system and methods of the present disclosure may utilize these six parameters (commonly referred to as Degrees of Freedom (DOF)) to uniquely define a 3D object placement in 3D space. The system and methods of the present disclosure may relate multiple shadow images to a common 3D object, and thereby relate those multiple shadows to each other in a spatial sense, and thus characterize other associated objects and their shadow artifacts whose dimensions and spatial relationships to the known 3D object is unknown.

In some embodiments, in the system and methods of the present disclosure, the six DOF may comprise x, y, and z linear translational components aligned with the x, y, and z axes along with 3 rotations 8x, 8y, 8z about the x, y, and z axes.

It is noted that multiplying the rotations and translations of such six DOF in matrix form yields the following:

$$\underbrace{\begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix}}_{X\text{-Rotation in 3D}} \underbrace{\begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix}}_{Y\text{-Rotation in 3D}} \underbrace{\begin{bmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{bmatrix}}_{Z\text{-Rotation in 3D}} \underbrace{\begin{bmatrix} 1 & 0 & 0 & Tx \\ 0 & 1 & 0 & Ty \\ 0 & 0 & 1 & Tz \\ 0 & 0 & 0 & 1 \end{bmatrix}}_{Translation\text{ in 3D}}$$

It is also noted that such results in a four-by-four matrix of high order transcendental equations. As one or ordinary skill in the art would be aware, solving a system of such matrixes, where the number of unknowns equals six, is extremely difficult given the non-monotonic nature of such functions. For example, a simple brute force multidimensional search through all possible solutions would yield an extremely large number of iterations in the search. In such an example, if one were to select each parameter have a granularity of ten steps for each parameter, the search space would contain 10/\6 sets (i.e., 1,000,000 sets) to evaluate, which is in fact a significantly course search. If one were to use a numerical solver in such a space, a legitimate concern would be the unknown nature of the spatial topography of the search space. In such spaces, the topography contains many local minima that would tend to funnel the search algorithm into a non-ideal solution. In most cases the non-ideal solution is unacceptable.

The inventor has recognized that simultaneous solutions to such a large number of unknowns, given the nature of the constraint equations used, is a rather challenging approach that often leads to unacceptable solutions. As such, in the system and methods of the present disclosure, for a deformity correction procedure where multiple images (e.g., radiographs or other images) depicting a single fixation device in a common state are available, the problem is simplified. For example, in such an embodiments, the system and methods eliminate some of the unknowns by setting up the problem to use a fixed value for these parameters. Further, in some embodiments, the system and methods rank the unknowns in the order from most to least significant in terms of how they affect the cost function to be minimize, which are provisionally solved in smaller sets with the remaining unknowns being set to fixed values. Also, in some embodiments, the system and methods establish a ranking and suitable bounding for the unknowns, such that the most unbounded are solved first and the most bounded solved last. Still further, in some embodiments, the system and methods utilize different cost functions, or combinations thereof, for different unknowns to maximize the relative effectiveness of the cost function.

In some embodiments, the method further comprises constructing a three-dimensional model of the actual position and pose of the known collection of objects in the projected three-dimensional space.

In some embodiments, the present disclosure provides for a computer program product comprising a computer readable storage medium readable by one or more processing circuit and storing instructions for execution by one or more processor for performing a method as described above.

In present disclosure provides for a system comprising: a memory: at least one processor in communication with memory; and program instructions executable by one or more processor via the memory to perform a method as described above.

In one aspect, the present disclosure provides a method of constructing a transform that registers a two-dimensional (2D) image and a three-dimensional (3D) device depicted in the image, comprising:

- obtaining a digital 2D first image depicting a 3D device that has at least four non-coplanar identifiable fiducial artifacts:
- rotating the first image about an axis normal to the plane of the image such that a reference artifact of the device depicted in the image is oriented horizontal in the image plane;
- obtaining physical parameters of the device that are sufficient to create a 3D mathematical device model of at least the fiducial artifacts of the device;
- constructing the device model according to the obtained physical parameters of the device;
- creating a bounded area of interest on the first image that defines an area that contains the fiducial artifacts;
- identifying the depictions of the fiducial artifacts within the bounded area of interest in the first image, and assign each depicted fiducial artifact a respective reference label;
- determining a plurality of metrics regarding the position and trajectory of the depicted fiducial artifacts within the bounded area of interest in the first image;
- creating a mathematical device model of the device above of the first image in image space between the image and a selected focal point in image space; and
- determining a best pitch, spin and x-y-z positions of the device model as compared to the device depicted in the first image, determine a best x-y-z position of the focal point as compared to the device depicted in the first image, and, based thereon, constructing a transform that registers the first image and the device.

In some embodiments, determining a best pitch and spin of the device model as compared to the device depicted in the first image comprises iteratively adjusting the pitch and spin of the device model and determining corresponding positions of depictions of the fiducials thereof in the image space. In some embodiments, the method further comprises determining pitch and spin iterations which produce fiducial depictions that have the plurality of metrics that most closely matches the determined metrics of the fiducials in the first image. In some embodiments, the method further comprises determining a reference label correlation of the fiducials of the device model that has the plurality of metrics that most closely matches the determined metrics of the fiducials in the first image.

In some embodiments, determining best x and y positions of the device model as compared to the device depicted in the first image comprises, in the determined best pitch and spin determinations and with the determined best reference label correlation, iteratively adjusting the horizontal (x) and vertical (y) position of the device model and determine a horizontal and vertical position with fiducial depictions that that has the plurality of metrics that most closely matches the determined metrics of the fiducials in the first image. In some embodiments determining the best z positions of the device model and the focal point as compared to the device depicted in the first image, comprises, in the determined best pitch and spin and x-y position determinations and with the determined best reference label correlation, iteratively adjusting the height of the device model and the focal point with respect to the image plane to scale the depictions of the fiducials of the device model in the image plane that best matches that of the fiducials in the first image. In some embodiments, determining the best x and y positions of the device model and the focal point as compared to the device depicted in the first image, comprises, in the determined best pitch and spin and x-y-z position determinations, best z position of the focal point determination, and with the determined best reference label correlation, moving the device model and focal point in x and y directions to best superimpose the device model depictions of the fiducials with the fiducial depictions in the first image.

In some embodiments, constructing the device model comprises creating a mapping of the 3D locations of the fiducials of the device in a reference artifact coordinate system of the device. In some embodiments, the mapping comprises an indication of the sizes of the fiducials. In some embodiments, the mapping comprises a point cloud.

In some embodiments, the plurality of metrics utilize a common aspect of the bounded area of interest in the first image to identify the position trajectory of each of the identified fiducial depictions.

In some embodiments, creating a mathematical device model of the device above of the first image in image space between the first image and a selected focal point in image space includes scaling the device model to the identified fiducial depictions. In some embodiments, creating a mathematical device model of the device above of the first image in image space between the first image and a selected focal point in image space further includes orienting the device model with no yaw or pitch. In some embodiments, the creating a mathematical device model of the device above of the first image in image space between the first image and a selected focal point in image space further includes orienting the device model with an approximated roll/spin based on viewpoint information of the first image and an approximated focal point.

In some embodiments, the method further comprises constructing a transform that registers a second two-dimensional (2D) image and the three-dimensional (3D) device depicted in the second image, comprising:

- obtaining a digital 2D second image depicting the 3D device that has at least four non-coplanar identifiable fiducial artifacts;
- rotating the second image about an axis normal to the plane of the image such that a reference artifact of the device depicted in the second image is oriented horizontal in the image plane;
- creating a bounded area of interest on the second image that defines an area that contains the fiducial artifacts;
- identifying the depictions of the fiducial artifacts within the bounded area of interest in the second image, and assign each depicted fiducial artifact a respective reference label;
- determining a plurality of metrics regarding the position and trajectory of the depicted fiducial artifacts within the bounded area of interest in the second image;
- creating a mathematical device model of the device above of the second image in image space between the image and a selected focal point in image space; and
- determining a best pitch, spin and x-y-z positions of the device model as compared to the device depicted in the second image, determine a best x-y-z position of the focal point as compared to the device depicted in the second image, and, and, based thereon, constructing a transform that registers the second image and the device.

In some embodiments, the method further comprises the device is an external fixation device. In some embodiments, the device the reference artifact of the external fixation device is a superior or inferior bone or tissue fixation platform.

In another aspect, the present disclosure provides a computer program product comprising: a computer readable storage medium readable by one or more processing circuit and storing instructions for execution by one or more processor for performing any of the methods disclosed above.

In another aspect, the present disclosure provides a system comprising: a memory; at least one processor in communication with memory; and program instructions executable by one or more processor via the memory to perform any of the methods disclosed above.

BRIEF DESCRIPTION OF THE DRAWINGS

The present disclosure will hereinafter be described in conjunction with the following drawing figures, which are not necessarily drawn to scale for ease of understanding, wherein the same reference numerals retain their designation and meaning for the same or like elements throughout the various drawings, and wherein:

FIG. 2 is a flow chart that depicts an exemplary method of constructing a transform (transformation matrix) that registers a 2D image with a 3D device depicted in the image, in accordance with an exemplary embodiment of the present disclosure:

FIG. 8 illustrates a plurality of metrics regarding the positions and trajectory of each of the identified fiducial depictions within the bounded area of interest with respect to a common reference of the bounded area, in accordance with an exemplary embodiment of the present disclosure:

FIG. 10 is a flow chart that depicts a further exemplary method of constructing a transform (transformation matrix) that registers a 2D image with a 3D device depicted in the image, in accordance with an exemplary embodiment of the present disclosure:

DETAILED DESCRIPTION OF THE INVENTION

Aspects of the present inventions and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the inventions in detail. It should be understood, however, that the detailed description and the specific example(s), while indicating embodiments of the inventions, are given by way of illustration only, and are not by way of limitation. Various substitutions, modifications, additions and/or arrangements within the spirit and/or scope of the underlying inventive concepts will be apparent to those skilled in the art from this disclosure.

Methods, systems and related computer program products of the present disclosure is configured to register one or more images with a three-dimensional known object/device/system depicted in the image, and thereby allowing for the production of a manipulable digital 3D model/depiction of the one or more images and a model of the device, and potentially other representations of other artifacts depicted/shown in the image(s), if desired. In some embodiments, the known three-dimensional device may be an external fixation device (e.g., a hexapod) coupled to anatomical structure(s) (e.g., one or more bone or bone segments). However, it is noted that one or ordinary skill in the art would be aware how the systems and related computer program products of the present disclosure may equally be employed to other devices or other external fixation device, and the inventions disclosed wherein include such embodiments.

Figure 1:
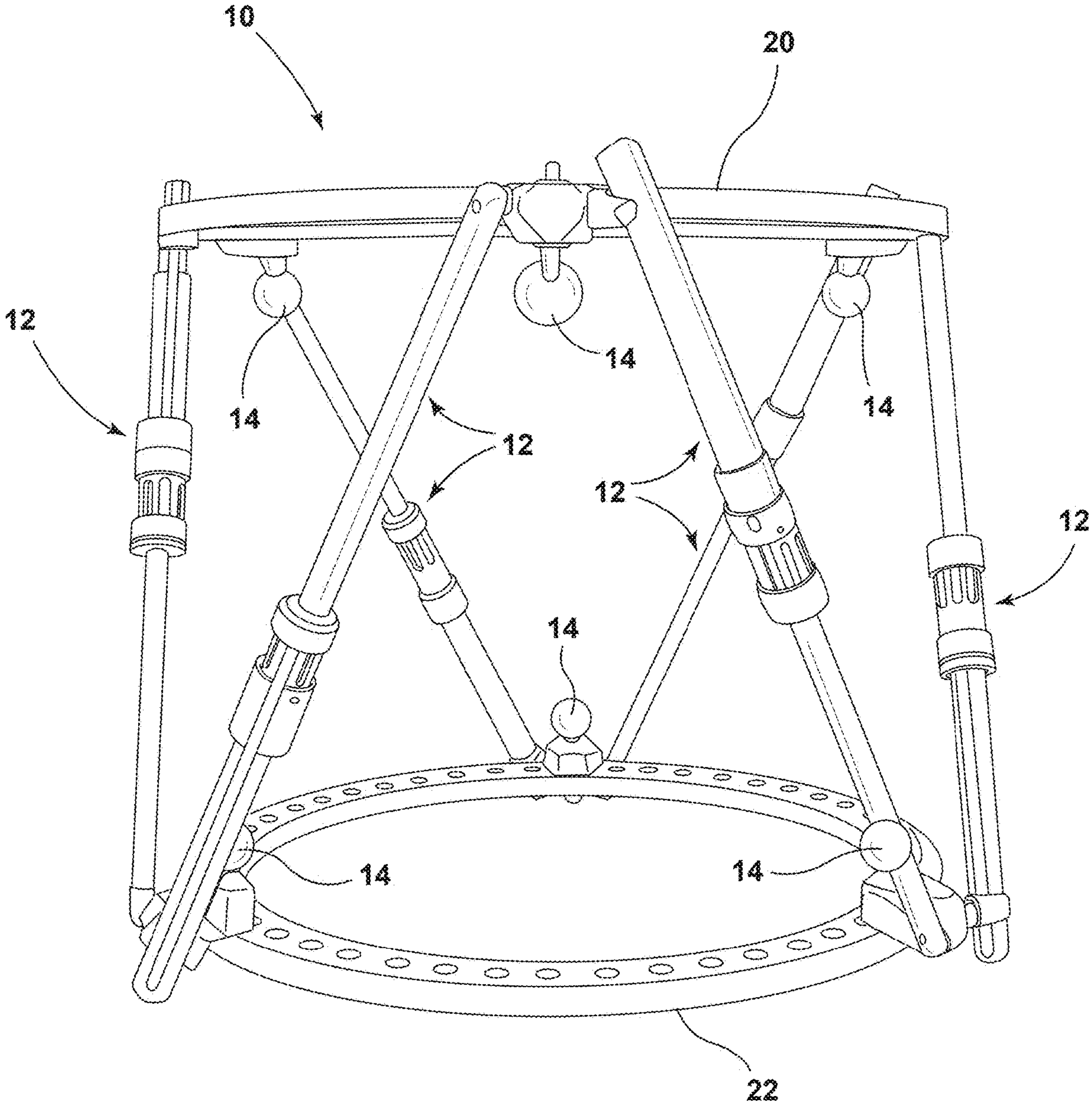
FIG. 1 illustrates an exemplary device that includes at least four non-coplanar identifiable fiducials, in accordance with an exemplary embodiment of the present disclosure.

For explanatory purposes, an external fixation hexapod 10, with two (e.g., circular) bone and/or tissue fixation platforms or rings 20, 22 connected with six length-adjustable struts 12 (via movable/adjustable joints) as shown in FIG. 1, coupled to at least pair of bone segments (not shown in FIG. 1) is utilized as the known three-dimensional device herein to describe the systems and related computer program products of the present disclosure. Specifically, a radiographic image (or other type of image) depicting the external fixation hexapod 10 and the bone segments, from a totally unknown or most approximated or general vantage point/viewpoint, is utilized herein for explanatory purposes. The radiographic image represents an image space with the external fixation hexapod 10 and the bone segments positioned between the image space and the focal point of the imaging device capturing the image. The image thereby depicts, contains or includes artifacts of the actual external fixation hexapod 10 and the actual bone segments. By properly registering at least two images to the external fixation hexapod 10 depicted therein (that is register the images to the 3D coordinate system of the device 10 depicted therein), a model of the external fixation hexapod 10 and the bone segments can be constructed, and utilized by a user to properly analyze the bone segment condition and determine an adjustment prescription plan for the length-adjustable struts 12 to correct the bone segment condition.

As shown on FIG. 1, the external fixation device 10 (or any other device) includes uniquely shaped and sized portions or fiducials 14 at fixed positions. In some embodiments, it may be necessary that the device 10 may have at least four such fiducials 14 that are not coplanar (i.e., not arranged along a common plane). The fiducials 14 are shaped such that they can be identified in an image, such as a radiographic image. The fiducials 14 may thereby be shaped differently or uniquely as compared to other portions of the device 10. Further, the fiducials 14 may be positioned at known locations on the device 10 such that the orientation and arrangement of the device 10 can be determined based on the orientation and arrangement fiducials 14 (and vice versa). In the exemplary illustrative embodiment, the fiducials 14 are spherical of a known diameter or radius, and positioned at the joints of the struts 12 and platforms 20, 22. Further, one of the fiducials 14 is of a unique (e.g., smaller) radius/diameter as compared to the others so that the orientation of the device 10 can be derived (e.g., to differentiate the top or bottom, or top or bottom platform 20, 22, of the device 10). However, it should be appreciated that other shapes besides spheres may be employed in the device 10.

Figure 3:
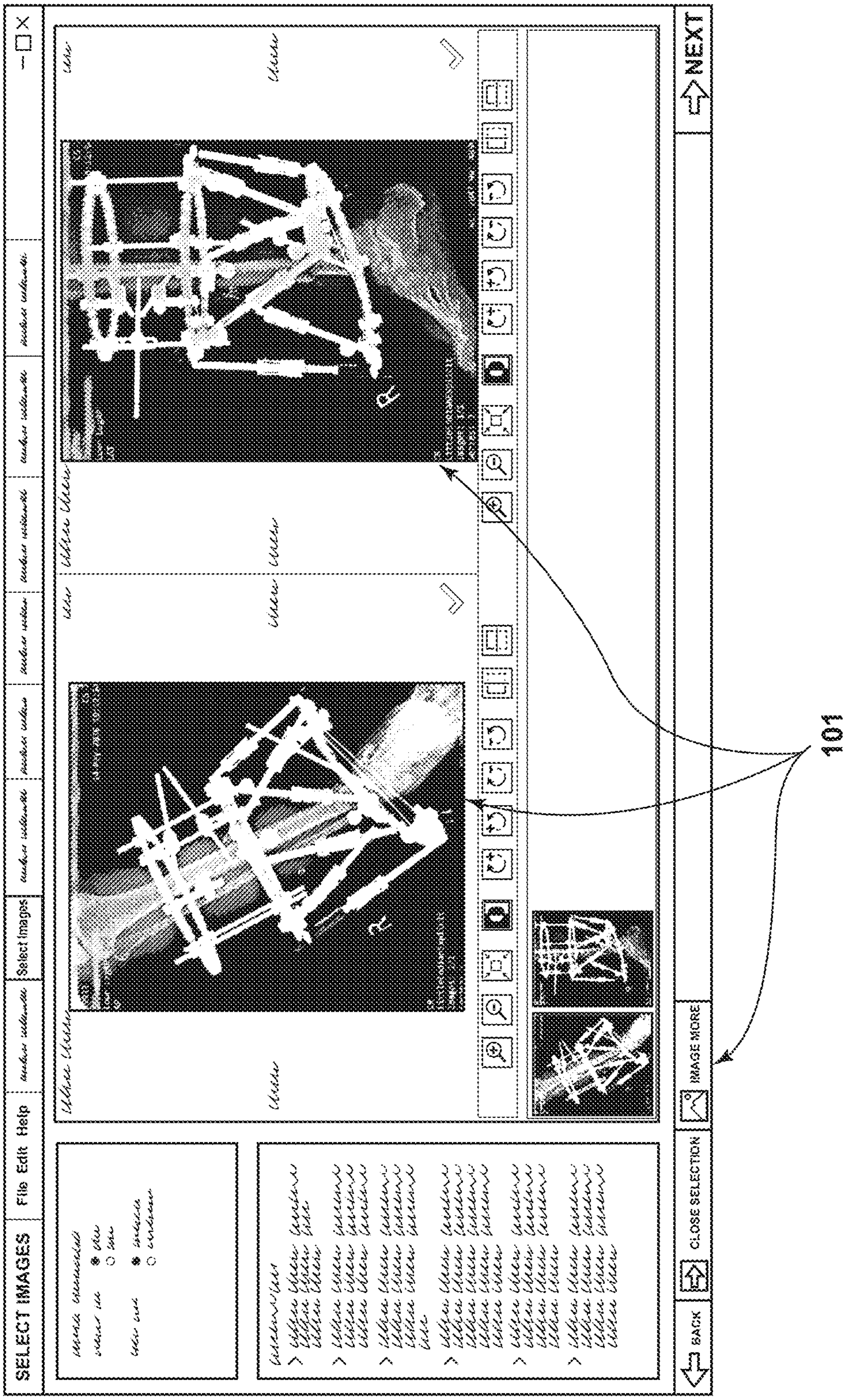
FIG. 3 illustrates the obtaining of at least one 2D image, in accordance with an exemplary embodiment of the present disclosure.

As shown in FIGS. 2 and 3, the methods, systems and related computer program products of the present disclosure may comprise obtaining 101 at least one 2D digital image (e.g., at least one radiograph or other image type) of the device (e.g., an external fixation device). In some such embodiments, obtaining 101 the at least one image may comprise automatically importing the at least one image from a file source, or obtaining the at least one image from a user who inputs the image(s). The user may interact with a graphic user interface (GUI) to obtain 101 the at least one image from a particular file source, thereby allowing the user to select the image(s). In some embodiments, the at least one image may be nominally tagged or identified as taken, roughly or approximately, from a particular vantage point or view. For example, an image may nominally be an AP or anterior-to-posterior view image, and another image may nominally be a ML or medial-to-lateral view image. In some embodiments, the methods, systems and related computer program products of the present disclosure may allow for up to +/−45 degrees of error in the images. For example, an AP or anterior-to-posterior view image may have an acceptable viewpoint that is +/−45 deg about the Z axis in the patient coordinate system off true AP (i.e., 0 degrees rot Z), and a ML or medial-to-lateral view image may have an acceptable viewpoint that is +/−45 deg about the Z axis in the patient coordinate system off true ML (i.e., +90 deg rot Z Left, −90 deg rot Z right). In some embodiments, the methods, systems and related computer program products of the present disclosure may also designate, identify or label an image as a primary image (e.g., a nominal AP view image), and another image a secondary image (e.g., a nominal ML view image). In some such embodiments, any additional images obtained 101 may be designated as oblique images.

As noted above, in some embodiments, the methods, systems and related computer program products of the present disclosure may preferable utilize (or require) images that depict at least four of the special identifiable artifacts of the device (e.g., fiducials of the device, such as spherical fiducials) whose 3D relationship is known with respect to the coordinate system of the device, and at least one of the identifiable artifacts not being coplanar with the other identifiable artifacts in the 3D device coordinate system. In some embodiments, the methods, systems and related computer program products of the present disclosure may also preferable utilize (or require) images that depict a clear demarcation between the superior and inferior portions (e.g., superior and inferior rings/platforms, plates etc.) of the device so that the superior and inferior ends of sides of the device can be determined.

Figure 4:
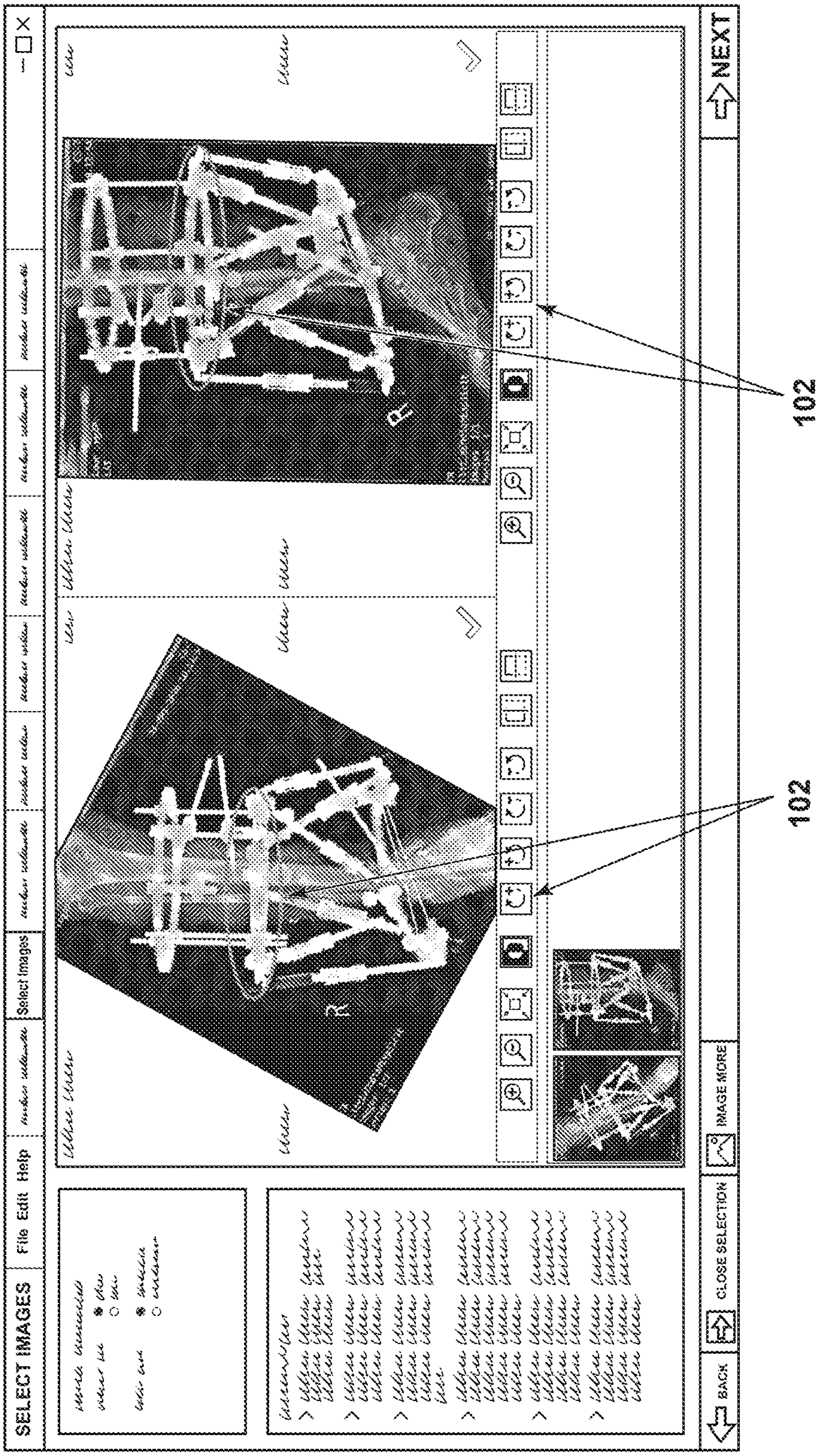
FIG. 4 illustrates rotation of the obtained 2D image, in accordance with an exemplary embodiment of the present disclosure.

In some embodiments, the methods, systems and related computer program products of the present disclosure may be configured so that the obtained one or more images are displayed on a GUI, and configured such that a user can rotate 102 each image about an axis normal to the plane of the image such that at least a portion of the device (e.g., a reference artifact) is oriented horizontally, as shown in FIGS. 1 and 4. For example, with respect the images of an external fixation hexapod with the first and second platforms, the methods, systems and related computer program products may allow a user to rotate the imported/obtained image(s) about an axis to the plane of the image(s) such that a reference artifact of the fixation device depicted in the image(s) (e.g., a superior or inferior platform/ring) is oriented horizontally in the image plane. For example, for a ring of an external fixation device (i.e., a circular mount), an image should be rotated such that the major axis of the ring is as close to horizontal as possible. The rotating 102 can be done either manually or by using image processing algorithms that can identify the geometric aspects of the external fixation device automatically. For external fixation devices that include different configurations, for example, any known horizontal reference may be used.

Figure 5:
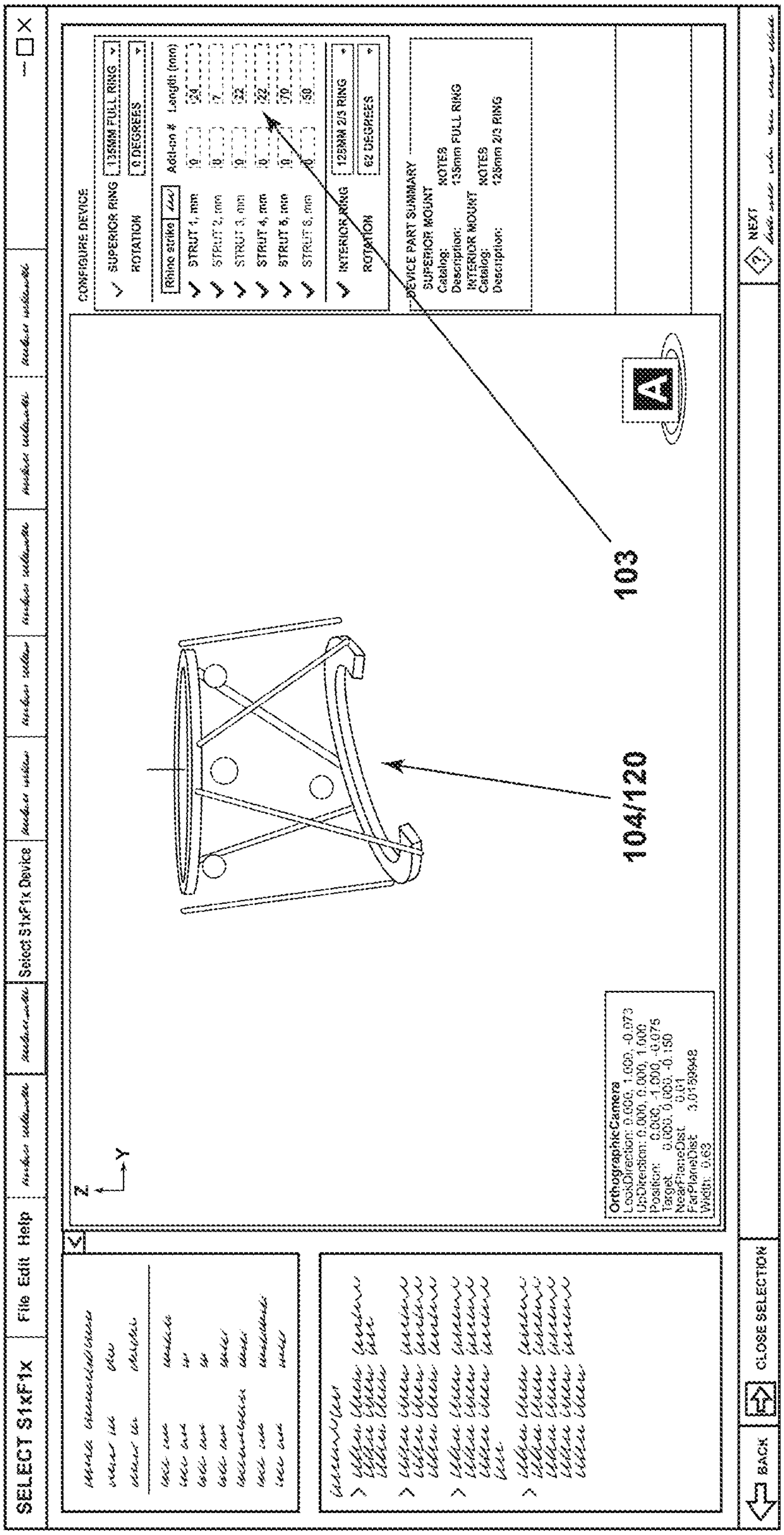
FIG. 5 illustrates obtaining physical parameters of the device depicted in the obtained 2D image, and the construction of a mathematical model of the device based on the obtained physical parameters, in accordance with an exemplary embodiment of the present disclosure.

In some embodiments, the methods, systems and related computer program products of the present disclosure, as shown in FIGS. 2 and 5, may comprise obtaining or collecting 102 pertinent physical parameters of the actual device that is depicted in the image(s) that are sufficient to create a three dimensional mathematical model of the device, such as metrics of components of the device and/or the settings of adjustable and/or configurable components/parameters of the device. For example, with respect to a hexapod as the known device depicted in the image(s), the lengths of the particular struts and/or strut settings (e.g., axial lengths), metrics regarding the platforms (e.g., ring/plate diameters, shapes, thicknesses, hole patterns, etc.) or other physical configuration data sufficient to virtually or mathematically recreate the device. The obtained physical parameters of the actual device should be sufficient such that the location of at least four non-coplanar artifacts (e.g., fiducials) of the device can be calculated or otherwise determined with respect to the 3D coordinate system of the device. With differing devices, other data may be pertinent, as one of ordinary skill in the art would appreciate.

Obtaining or collecting 102 the pertinent physical parameters/metrics may comprise automatically importing the parameters/metrics from a file source, or obtaining the parameters/metrics from a user who inputs the parameters/metrics as shown in FIG. 5, for example. The user may interact with a graphic user interface (GUI) to input 102 the parameters/metrics.

As shown in FIGS. 2 and 5, with the obtained physical parameters of the actual device that is depicted in the image(s), the methods, systems and related computer program products of the present disclosure may create 104 a mathematical 3D model or description of the device based on the parameters in a coordinate system of the device sufficient to define the relative 3D cartesian coordinates of the fiducials. The model may orient the reference artifact horizontally.

The mathematical model or description of the device may define or describe the relative positions of the fiducials in the 3D coordinate system of the device, such in a reference artifact coordinate system with respect to a reference artifact, the reference artifact (e.g., a platform) potentially being horizontally oriented. In some embodiments, creating 104 the mathematical model or description of the device based on the obtained parameters may comprise creating a mapping of the 3D locations of at least four non-coplanar fiducials of the device in a reference artifact coordinate system of the device. The mapping (i.e., the model) may also comprise the sizes/shapes of the fiducials. The mathematical model/mapping may take the form of a point cloud with the points representing the fiducials of the device using the reference artifact coordinate system, and may include the size/shape (e.g., diameter) of the fiducials.

In some embodiments, the methods, systems and related computer program products of the present disclosure may create a virtual/computer 3D model 120 of the device based on the obtained parameters in the coordinate system of the device (or based on the mathematical model or description of the device), and display the virtual/computer 3D model 120 to a user on a GUI, as shown in FIG. 5. In some embodiments, the virtual/computer 3D model 120 may be manipulatable such that a user can interact with the virtual/computer 3D model 120 and reorient it (e.g., spin, pitch and/or rotate/yaw the model 120 on the GUI). The model 120 can thereby serve as a visual check to a user that the parameters were entered correctly (i.e., that the virtual model of the device 120 created based on the parameters matches the appearance of appearance of the actual device (e.g., via viewing the actual device or based on the artifacts of the device in the image(s)).

Figure 6:
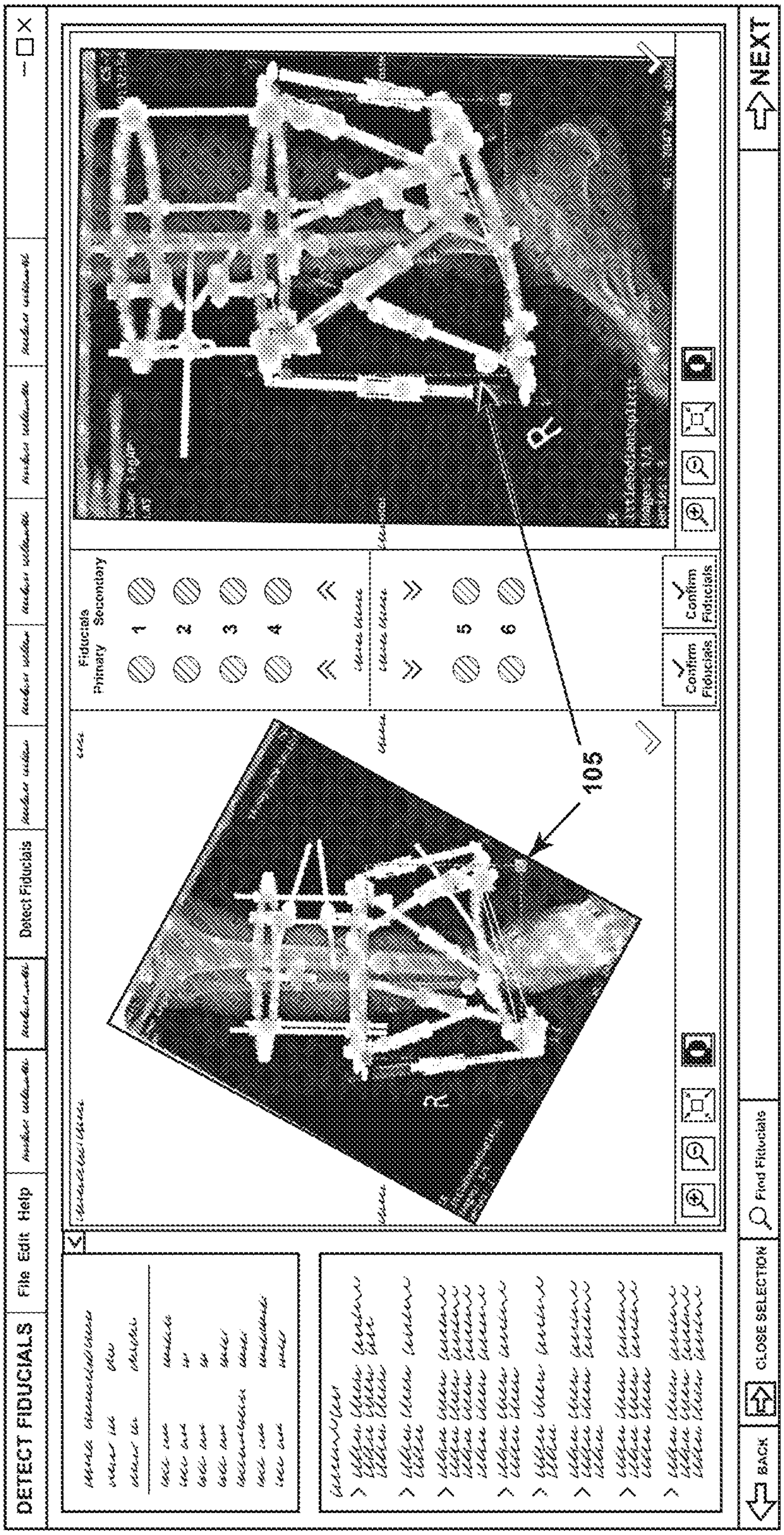
FIG. 6 illustrates creating a bounded area in the obtained 2D image that contains depictions of fiducials of the device in the obtained 2D image, in accordance with an exemplary embodiment of the present disclosure.

As shown in FIGS. 2 and 6, with at least one image obtained, the methods, systems and related computer program products of the present disclosure may be configured to display each image on a GUI, and allow a user to create a bounded area of interest around an area of each displayed image, via the GUI, that contains the depictions of the at least four non-coplanar fiducials/unique known artifacts of the device. Each bounded area of interest may be utilized, as described further below, to direct the methods, systems and related computer program products to a particular portion of each image to search within for identification of depictions of the fiducials. As also described above, each bounded area of interest may be utilized to by the methods, systems and related computer program products to define parameters that define the positions and/or size of the fiducial depictions in the respective image with respect to a common reference, and thereby aid in determining the orientation and spin of the device in image space, as explained further below.

The bounded area of interest in each obtained image may preferably have at least one horizontal linear reference. For example, a simple area of interest with at least a single horizontal reference may be a rectangle with a horizontal top and/or bottom edge. In some other embodiments, a horizontal bisector may be utilized. In some embodiments, a circular area of interest could be used where the horizontal reference may be a line, such as an equator or some other line of latitude as a bisector, for example. In some other embodiments, the bounded area of interest may not include a horizontal linear reference. For configurations where a horizontal bisector is used, the bisector could be positioned to demarcate the reference and non-reference mounts or the particular artifacts attached to each, for example. Such a process could be done either manually or by using image processing algorithms that can identify the demarcation aspects of the external fixation device automatically. In some embodiments, the methods, systems and related computer program products may include creating a vertical line of demarcation. In some embodiments, after creating I 05 a bounded area of interest, the methods, systems and related computer program products may include computing the center or centroid of the area of interest.

Figure 7:
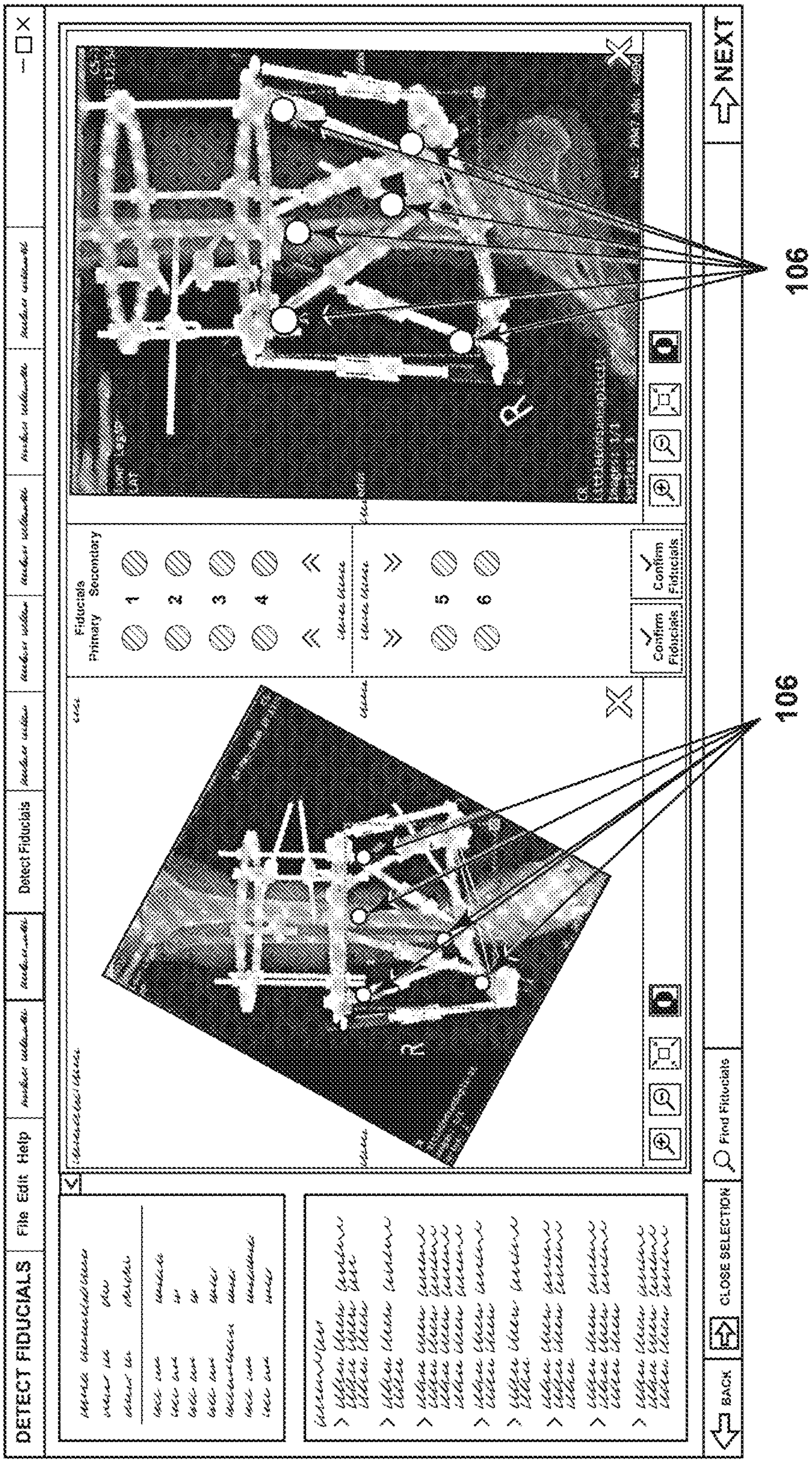
FIG. 7 illustrates identify the fiducial depictions of the device in the obtained 2D image, in accordance with an exemplary embodiment of the present disclosure.

After creating the bounded area of interest, the methods, systems and related computer program products may be configured to identify 106 and provisionally labelling the fiducials/unique artifacts of the with the bounded area of interest for each image, as shown in FIGS. 2 and 7. For example, labels such as 1, 2, 3 . . . . N could suitably be utilized for each identified fiducial. As noted above, at least four fiducials should be identified. As shown in FIG. 7, the methods, systems and related computer program products may illustrate the detected fiducials on a GUI. Further, in some embodiments, the methods, systems and related computer program products may allow a user to identify, via the GUI and an input device, the fiducial depictions, and/or correct any automated fiducial identifications that may be incorrect (at least partially). For example, an image may be drawn or otherwise positioned over each fiducial depiction in an image. In some embodiments, the fiducial labels may also be displayed on the GUI.

In some embodiments, after the bounded area of interest is created, the methods, systems and related computer program products may determine 107 a plurality of metrics regarding the positions and trajectory of each of the detected depictions of the at least four fiducials in each image within the bounded area of interest with respect to a common reference of the bounded area, as shown in FIGS. 2 and 8. For example, determining 107 the plurality of metrics may comprise creating a collection of parametric characteristics or parameters regarding the artifacts contained within the bounded area of interest for each image. For example, a first exemplary collection of parameters for the artifacts contained within the bounded area of interest could be the angle of a line connecting the centroid of the area of interest to the center or other suitable aspect of the collection of artifacts makes with respect to some common reference. A common reference could be the angle made with respect to the vertical or horizontal reference line, for example. As another example, a second exemplary collection of parameters for the artifacts contained within the bounded area of interest could be the angle a line connecting each center or suitable aspect of the artifacts make with the other artifacts makes with respect to some common reference. As another example, a third exemplary collection of parameters for the artifacts contained within the bounded area of interest could be the distance (either vertical or horizontal, for example) from some reference characteristic of the bounded area of interest. As yet another example, a collection of parameters for the artifacts contained within the bounded area of interest could be a combination of the first, second and/or third exemplary collections of parameters discussed above. It is noted that any geometric equations/parametric characteristics/parameters describing or recording the positions and trajectory of each of the detected depictions of the at least four fiducials in each image within the bounded area of interest with respect to a common reference may be utilized.

Figure 9:
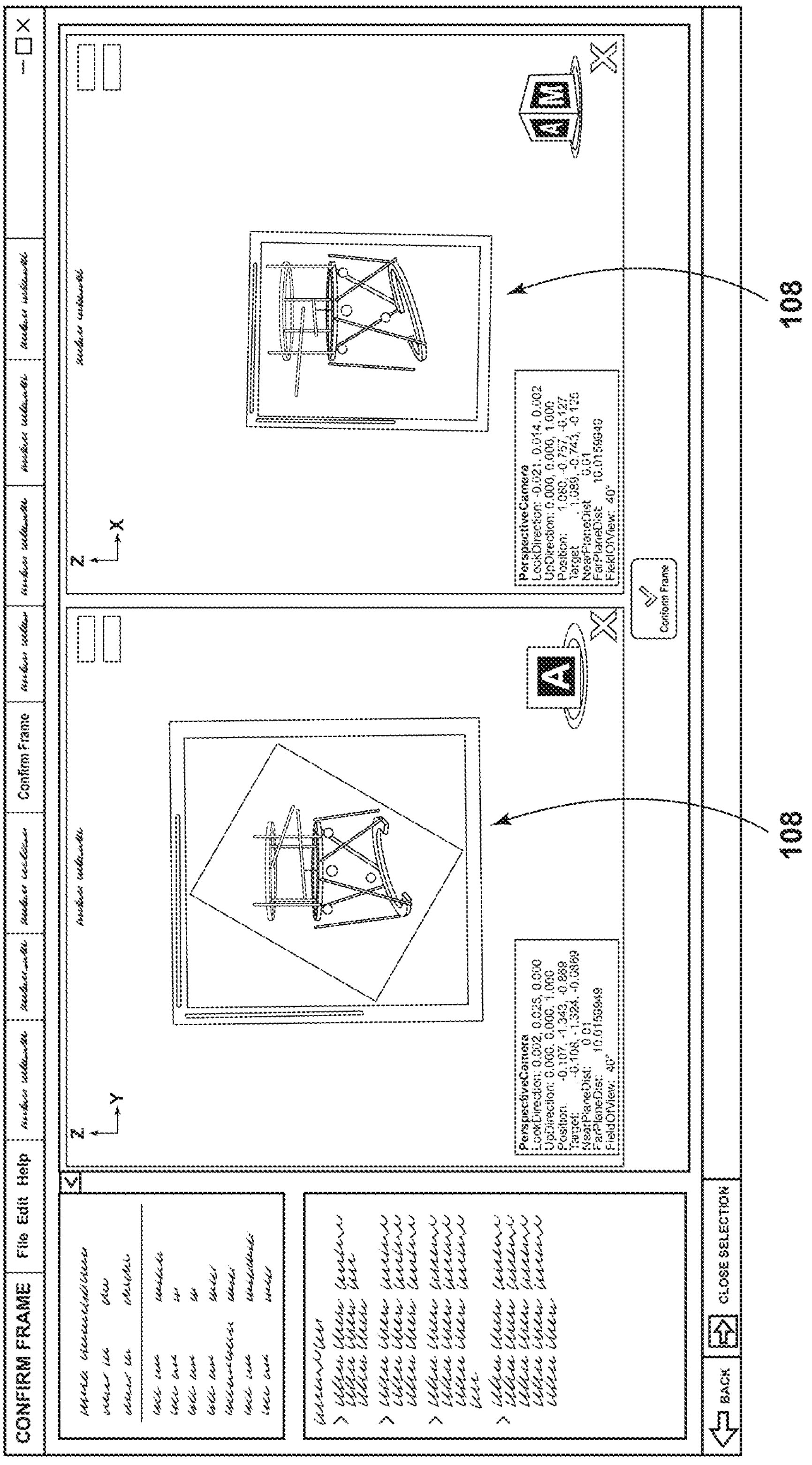
FIG. 9 illustrates the creation of a mathematical model of the device above the obtained 2D image in image space between the image and a selected focal point above the image using the mathematical model of the device, in accordance with an exemplary embodiment of the present disclosure.

In some embodiments, as shown in FIGS. 2 and 9, the methods, systems and related computer program products may create a mathematical model of the device 108 above each of the obtained images in image space (i.e., in a coordinate system relative to the image) between the image and a selected focal point above the image (in the z direction) using the mathematical model of the device in device space. For example, the mathematical model of the device 108 above each of the obtained images in image space (or image coordinate system), between the image and a selected focal point above the image plane, may be represented by a transformation matrix (e.g., a four-by-four transformation matrix). The transformation matrix may provide a transform between the image space/coordinate system and the device space/coordinate system, and/or define defining the locations of the fiducials of the mathematical model of the device 108 in the image space (or image coordinate system) above the image and between the image and the focal point.

In some embodiments, the mathematical model of the device 108 may be formed or modified such it is scaled to the device in the respective image. For example, the relative size/scale of the fiducials in the image (either individually or collectively, for example) with respect to the bounded box may be compared to that of the mathematical model of the device 108 and utilized to scale the mathematical model of the device 108.

In some embodiments, the creation of the mathematical model of the device 108 may include selecting an arbitrary focal point location above the device in image space such that vectors/lines emanating from the focal point to the fiducials further extend therefrom/therethrough and intersect the image plane. In such embodiments, the focal point may be nominally centered on the model of the device 108 and positioned at a height above the model of the device 108 such that the intersections, which equate to cast fiducial depiction locations of the model of the device 108 in the image plane, are in a reasonable state of magnification and similar to what a typical radiograph would produce with a device positioned close to a given instance pitch and spin.

In some embodiments, the creation of the mathematical model of the device 108 may include creating the mathematical model of the device 108 above the image plane/image array at an arbitrary height and arbitrary center such that a reference artifact of the model of the device is oriented horizontally. It is noted that in the case of a ring or flat platform, this would have the major axis of the platform oriented horizontally.

In some embodiments, the creation of the mathematical model of the device 108 may include creating the mathematical model of the device 108 creating the mathematical model of the device 108 above the image plane/image array between the image plane and the focal point with no yaw or pitch, and at an approximated roll/spin. The approximated roll/spin may be provided/obtained with the image (e.g., as metadata or tagged data), or provided by the user as a user input, for example.

With the mathematical model of the device 108 created, the methods, systems and related computer program products may comprise obtaining/collecting/determining the intersection locations of the lines/vectors passing from the selected focal point, through the fiducial locations of the mathematical model of the device (in image space), and interesting the image plane, as described above. Such intersection locations may be determined as a second point cloud defining the locations of the fiducials of the mathematical model of the device 108 in the image plane. In some embodiments, the second point cloud may be formed by the product of the transformation matrix (or a portion thereof) and the point cloud (or a portion thereof) defining the device in the device space (or device coordinate system). The methods, systems and related computer program products may label the each of the locations of such a determined 2D array of the cast fiducial depiction locations of the model of the device in the image plane. For example, labels such as A, B, C . . . Z could suitably be utilized.

In some embodiments, the methods, systems and related computer program products using the collection of image plane intersection locations of the device model in image space to create a similar bounded area of interest in the image plane to the one previously created as described above. In such a secondary bounded area of interest, the same or similar parameter or equations defining/describing the location and trajectory of each of the determined intersections (representing the cast/depicted model fiducials) within the bounded area of interest with respect to a common reference may be determined/created as described above. As such, in some embodiments, the same plurality of metrics (geometric equations/parametric characteristics/parameters) describing or recording the positions and trajectory of each of the determined intersections (representing the cast/depicted model fiducials) of the at least four fiducials in the image plane within the bounded area of interest with respect to a common reference may be utilized as those utilized with the fiducial depictions in the obtained image as described above. As described above, these plurality of metrics (geometric equations/parametric characteristics/parameters) describing or recording the positions and trajectory of each of the fiducial depictions/shadows in the image plane can be compared to construct a transform (transformation matrix) that registers the 2D image and the 3D device (model).

As shown in FIG. 2, with the device model created (above the image in the image space between the image and the selected focal point), and the model potentially scaled, oriented without yaw or pitch and in an approximate roll/spin based on image information (e.g., an indication of an AP/anterior-to-posterior view image or an ML/medial-to-lateral view image, for example), and the approximated focal point selected, the methods, systems and related computer program products may be configured to iteratively adjust the 3D orientation of the device model in 3d image space to determine a best pitch, spin and x-y-z positions of the model, determine a best x-y-z position of the focal point, and based thereon, construct 150 a transform (transformation matrix) that registers the 2D image and the 3D device (model) depicted in the image. As noted above, and described further below in detail with respect to FIG. 10, the construction 150 of the transform utilized iterative 3D adjustments of the device model 108, and analyzing the model fiducial intersections/depictions in the image space via comparing (e.g., scoring to determine the best or closest match of) the parameters or equations defining/describing the location and trajectory of the model fiducial intersections/depictions in the image space (with respect to the bounded box reference) to the same parameter or equations defining/describing the location and trajectory of the fiducial depictions in the actual respective image (with respect to the bounded box reference).

As shown in FIG. 10, to construct 150 the transform, the methods, systems and related computer program products may iteratively adjust 109 the pitch and spin of the virtual model 108 and determine corresponding positions of intersections/depictions of the fiducials thereof in the image space/plane with metrics that most closely match that of the fiducial depictions in the actual image to determine a best pitch and spin orientation(s) of the device model that best matches that of the actual device (when the image was taken). For example, as discussed above, for each pitch and spin iteration or adjustment, vectors extending from the focal point and intersecting the image plane, and passing through the model fiducial locations, may be determined. The intersections of the vectors can then be utilized as fiducial depictions, the bounded box constructed, and the plurality of metrics regarding the positions and trajectory thereof determined. The metrics can then be compared to the metrics of the actual fiducial depictions in the respective image (previously determined) to score each pitch and spin iteration, and thereby determine a pitch and spin that best matches (or plurality of best matches) to that of the actual device (when the image was taken).

To address pitch up and or down of the reference mount, a suitable angular range may be selected for such pitch in terms of a lower and upper bounds with respect to the plane of the reference portion of the device being perpendicular to the image array. To address spin rotation about the Z axis in the patient coordinate system off a nominal AP (0 deg) or ML image, a suitable angular range may be selected, such as +/−45 degrees for example. A suitable granularity of steps for the pitch and spin between the upper and lower bounds for the angular ranges described above may also be selected or configured.

For example, for each of the possible correlation, the methods, systems and related computer program products of the present disclosure, in some embodiments, may be configured to iterate 109 through a nested collection of pitch and spin steps of the device model 108. In some embodiments, at each iteration step the methods, systems and related computer program products may compare the collection of parameters determined as described above to develop a cost or score for each instance in the series for each association. The methods, systems and related computer program products, in some embodiments, may also be configured to further determine an arbitrary number of the minimum cost instances out of all the possible associations and pitch and spin steps. For example, the methods, systems and related computer program products may be configured to collect the top five associations costs over the breadth of the pitch and spin steps, and determine whether there is a distinct minimum cost (e.g., a cost that is significantly lower than the second lowest cost, and so on). If a distinct minimum cost is significantly lower, the number of minimum cost associations needed to store for possible evaluation later, in this case, can be reduced to a single association. If two or more associations have a similar minimum cost, however, they all may be stored for later evaluation.

As shown in FIG. 10, to construct 150 the transform, the methods, systems and related computer program products may, for each iterative pitch and spin, may determine a reference label correlation of the fiducials of the model that has the metrics that most closely match that of the fiducial depictions in the actual image to determine a best correlation of the labels, such as via the process described above with respect to the "best" iterative pitch and spin. For example, a list of possible correlations or matches of the fiducial labels may be 1-A, 2-B, 3-C, or 2-A, 1-B, 3-C, or 3-A, 1-B, 2-C, and so on until all possible associations are identified. To increase speed and efficiency as well as accuracy, in some embodiments, some possible associations can be eliminated using the demarcations of the bounded area.

The methods, systems and related computer program products, in some embodiments, may be configured to collect and store the lowest cost pitch and spin increment for further evaluation for the collection of minimum associations. At this point, the methods, systems and related computer program products may have thus determined a similar collection of artifacts in terms of their relative positioning and proportion within the area of interest as compared to the associated artifacts in the actual image. Similarly, the methods, systems and related computer program products will have determined a confident association between the artifacts, along with a high confidence in the relative positioning of the external fixation device in terms of spin and pitch. Depending on the value of the minimum score, the methods, systems and related computer program products, in some embodiments, may be configured to further refine the association between the artifacts and/or the relative positioning of the device model 108 by repeating the aforementioned steps using a tighter bounds and higher granularity about the current optimal positioning and pose of the device model 108. In addition, if it was determined that some number of the arbitrary number of minimum ranked scores were close in value, the methods, systems and related computer program products, in some embodiments, may evaluate other associations using such a tighter higher granularity bounded search.

As shown in FIG. 10, to construct 150 the transform, the methods, systems and related computer program products, in some embodiments, may, in the determined best pitch and spin determination(s) and with the best reference label correlation(s), iteratively adjust 110 the horizontal and vertical (x and y) position of the mathematical device model 108 (with respect to focal point and image plane) and determine a horizontal and vertical position with fiducial depictions/intersections that has the plurality of metrics that most closely matches the determined metrics of the fiducial depictions in the obtained image (thereby a skew determination or correction). It is noted that the "best" horizontal and vertical (x and y) position may be determined via the same method or process described above with respect to the "best" spin and pitch (via scores or costs that rank or rate the similarity of the positional metrics of the fiducial depictions/intersections), and is not repeated herein for brevity's sake.

As shown in FIG. 10, to construct 150 the transform, the methods, systems and related computer program products, in some embodiments, may, oriented in the determined best pitch, spin and x-y position, iteratively adjust 111 the height of the virtual model and the focal point with respect to the image plane to scale the depictions/intersections of the fiducials of the model that best matches that of the fiducial depictions in the obtained image (thereby a scale determination or correction). It is noted that the "best" scale can be measured or determined via a variety of ways, such as utilizing the collective size of the fiducials, bounding box correlation, etc.

As shown in FIG. 10, to construct 150 the transform, the methods, systems and related computer program products, in some embodiments, may, in the oriented in the determined best pitch, spin and x-y position and the height of the virtual model and the focal point (in image space), move 112 the virtual frame and foal point in x and y directions to best superimpose the model fiducial depictions/intersections of the model with the fiducial depictions in the obtained image. It is noted that the "best" superimposition can be measured or determined via a variety of ways.

Figure 11:
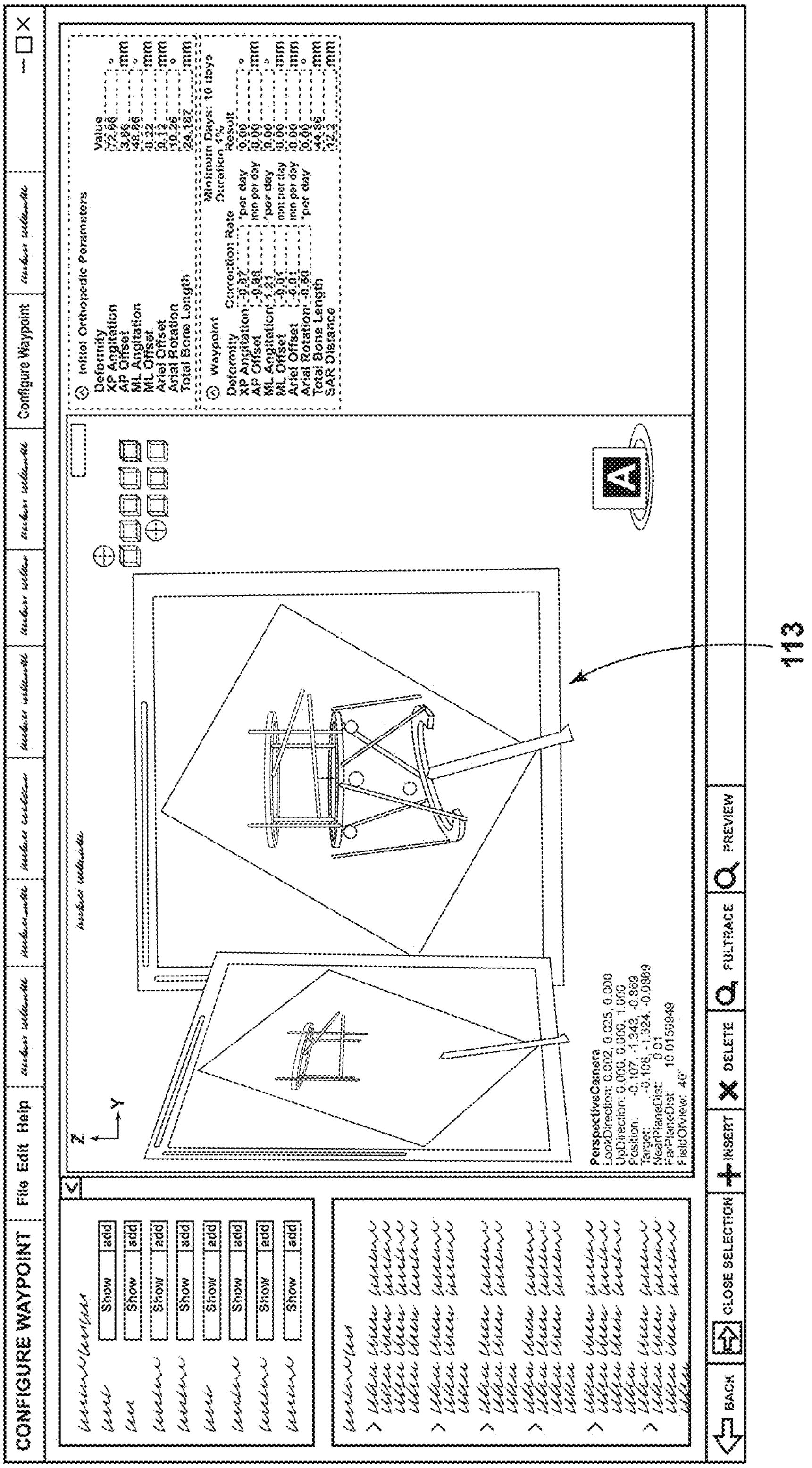
FIG. 11 illustrates the registration of the obtained 2D image and the 3D device model of device depicted in the image, in accordance with an exemplary embodiment of the present disclosure.

As shown in FIGS. 10 and 11, to construct 150 the transform, the methods, systems and related computer program products, in some embodiments, may, in the determined best pitch spin and x-y-z position of the focal point, such a "best matching" orientation of the device model 108 can be utilized (e.g., the point cloud of the fiducials in such a "best matching" orientation) to construct 113 a transform that registers the obtained image and the device model. As shown in FIG. 11, the registered image(s) and the device model may be displayed to a user on a GUI. In some embodiments, the registered image(s) and the device model may be manipulatable such that a user can interact with the registered image(s) and the device model and reorient them together as a unit (e.g., spin, pitch and/or rotate/yaw the model 120 and the image on the GUI). The device model can also be altered to show how changes in the device would appear with respect to the shown image(s).

It is noted that the process 100 of FIG. 2 and process 150 of FIG. 10, can be used for one, two, three or however many images that is desired. However, it is also noted that the transform can be constructed 113 from only a single image.

In some embodiments, to further refine the similarity of the simulated collection of fiducials to the actual collection of fiducials, the solution arrived as discussed above, the methods, systems and related computer program products may be configured to utilize the determined actual collection of fiducials in an iterative translational focal point search to determine a nominal device model 108 position. For example, the moving the focal point in the height dimension above the image will result in a similar simulated collection of fiducials to the simulated fiducials arrived as described above, since adjusting the height of the focal point will only alter the scale of the simulated collection of fiducials. However, translation of the focal point in the two dimensions of the simulated image will alter the relative positions of the simulated fiducials thus changing the costs as measured as described above. In some such embodiments, the methods, systems and related computer program products may utilize the vertical and horizontal position of the focal point determined as described above, and select a suitable granularity and number of steps between a lower and upper bound for both the horizontal and vertical dimensions (thereby essentially creating a search array). Using the association of simulated verse actual fiducials determined as described above, the methods, systems and related computer program products may iterate through the nested horizontal and vertical steps and cast fiducials (e.g., similar to those created as described above). The methods, systems and related computer program products may, each step, compute the cost. It is noted that step with the minimum cost should result in a simulated collection of fiducials that are most similar to the actual collection of fiducials of the external fixation device.

Having determined the optimum degree of similarity, the methods, systems and related computer program products may be configured to adjust the horizontal and vertical alignment such that cast shadows are centered on the actual shadow in the image. For example, the methods, systems and related computer program products may determine a centroid for the collection of cast and actual shadows. Such may be accomplished via any method. For example, determining a suitable centroid may comprise utilizing the center of a rectangular box encompassing the collection of cast and actual shadow centers, or utilizing the centroid of a polygon of an encompassing perimeter of the collection of the cast and actual shadows, for example. Once the centroid has been determined for both the cast and actual shadows, the methods, systems and related computer program products may determine (e.g., calculated) the horizontal and vertical difference, and the frame and focal point may both be translated relative to the image in accordance with the difference, using the horizontal and vertical difference, to align the centroids.

With the centroids aligned, the methods, systems and related computer program products may adjust the scale of the cast fiducial shadows to match the actual fiducial shadows. For example, the height of the focal point may be adjusted until the area of the box or polygon (formed as described above) (representing both the cast and actual shadows) is equal. It is noted that after such, the cast and actual shadows should match and the location of both the focal point and the position and pose of the frame above the image would be known/determined by the method.

Using the position and pose of the frame in relation to the image, the methods, systems and related computer program products may then determine the 3D coordinates for any collection of three points on the external fixation device/frame representing the fiducials that cast the shadows. The methods, systems and related computer program products may construct a transformation matrix, such as via utilizing suitable cross products of vectors connecting the points and the offset any given point with respect to the image coordinate system. The methods, systems and related computer program products may then determine a camera origin using the 3D focal point and a camera target using the centroid location in the image resulting in a sight vector for the camera to be used in setting up a 3D virtual world depicting the frame and image.

Lastly, the methods, systems and related computer program products may repeat the processes shown in FIGS. 2 and 10 for each obtained image, which results in a complete manipulable 3D depiction/model of the images and the device depicted therein. The 3D depiction/model can be presented and manipulated by a user to analyze and determine the construct such as to analyze and determine a fixation prescription by manipulating the device (which manipulates anatomical structures), as is known in the art.

As noted above, in some embodiments, the process 100 of FIG. 2 and process 150 of FIG. 10 can be repeated for two or more images of a device.

For example, it may be desired to register image artifacts of a patient's anatomy with respect to a device/frame that has been used as a reference for a plurality of images within which the artifacts reside. Such may be the case where a patient's bone fragments need be characterized with respect to each other or with respect to other artifacts contained within an image.

Using a plurality of images that have been registered to a common device of reference, via the methods 100 and 150 for example, the coordinate system used to describe the device of reference is first utilized. The plurality of images having been registered to this device coordinate system now have all of the two-dimensional artifacts within the images transformed into the three-dimensional coordinate system belonging to the device of reference.

Taking the example of bone fragments, these can be depicted as lines drawn on the image with the endpoints of the lines representing the endpoints of the fragments with the line being coincident with the fragment axis. Taking the line endpoints along with the focal point all being three-dimensional coordinates in image space in a first image and transforming them to the common device of reference two vectors can be constructed between any two of the three points which when taking the cross product between them results in a first plane normal vector which can be used along with any of the points to define a first plane in the common device of reference, as shown in FIG. 12.

Figure 12:
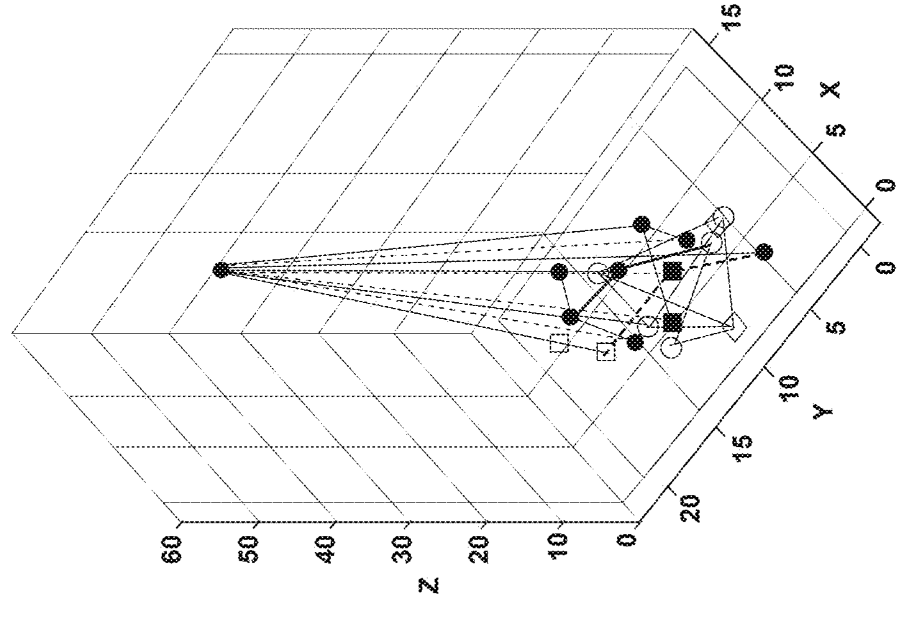
FIG. 12 illustrates a potential application of the registration of the obtained 2D image and the 3D device model of device depicted in the image, in accordance with an exemplary embodiment of the present disclosure.
Figure 14:
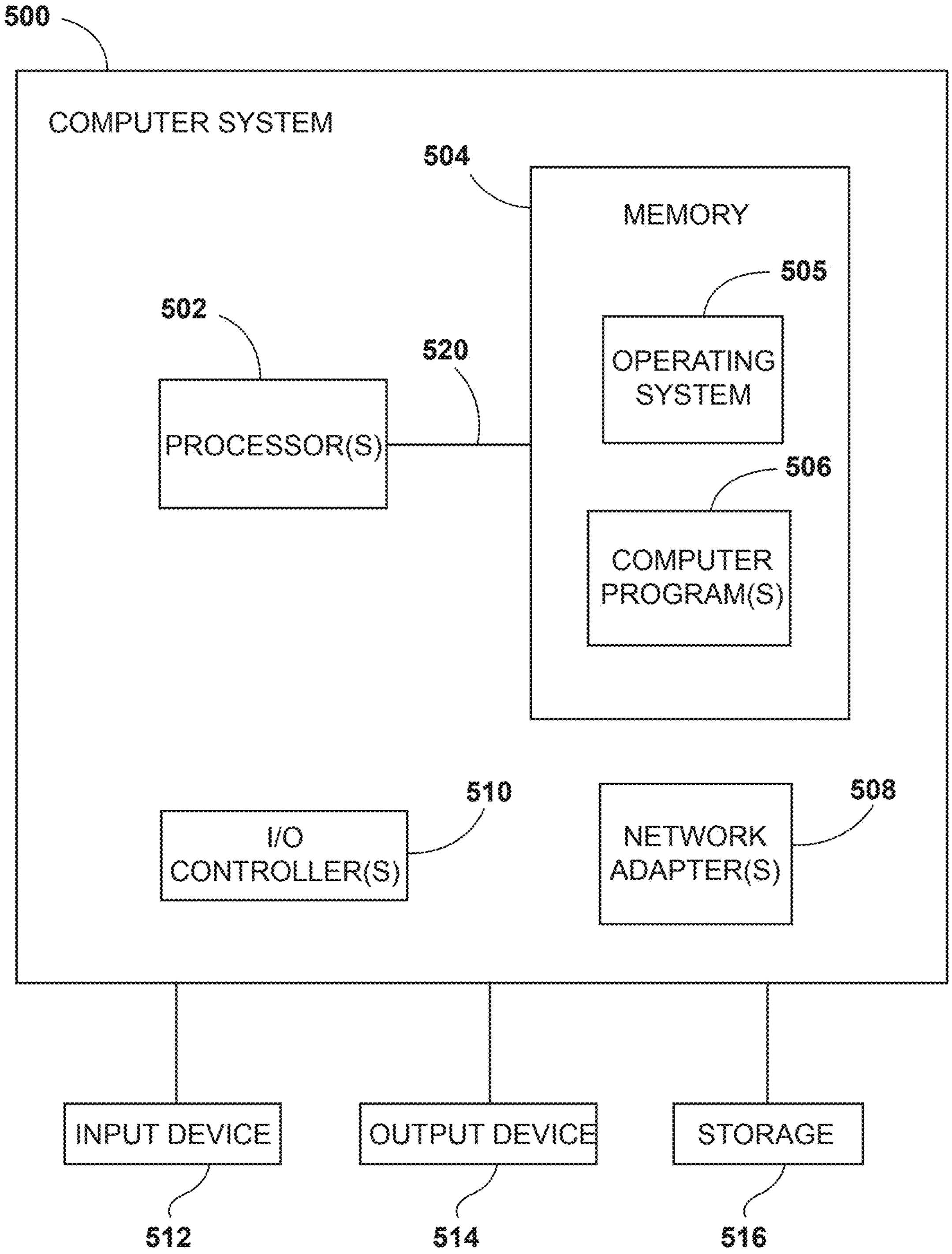
FIG. 14 depicts an exemplary computer system that may be utilized to perform aspects (e.g., methods) of the present disclosure.

Similarly taking the line endpoints along with the focal point all being three-dimensional coordinates in image space in a second image and transform them to the common device of reference two additional vectors can be constructed which when taking the cross product between them results in a second plane normal vector which can be used along with any of the points to define a second plane in the common device of reference, as shown in FIG. 12.

Figure 13:
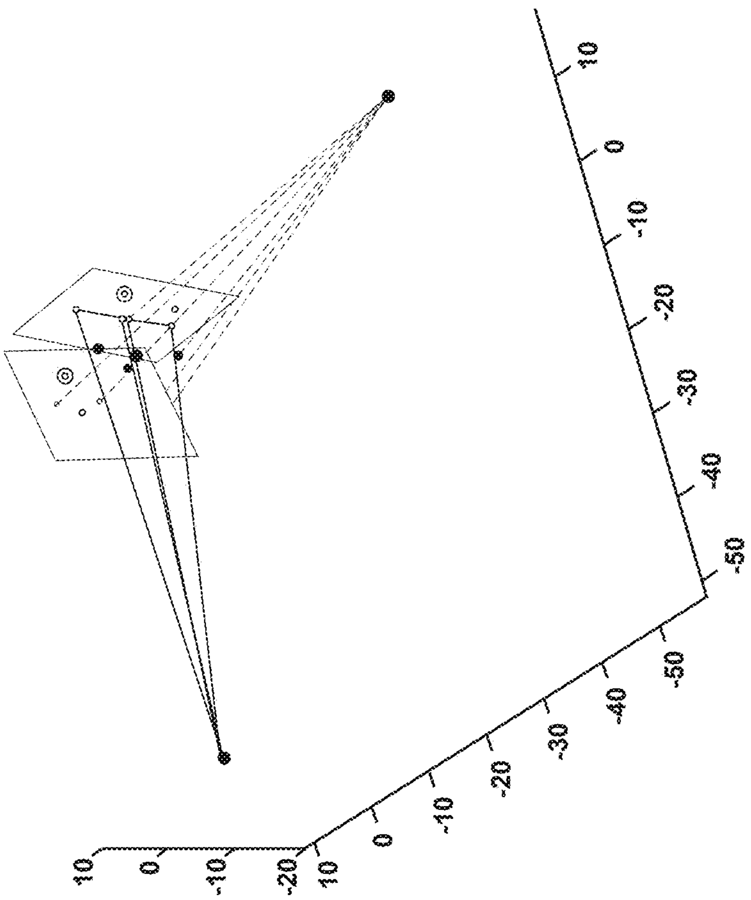
FIG. 13 illustrates the depiction and registration of two 2D images and additional artifacts depicted in the images, and a 3D device model of device depicted in the images, in accordance with an exemplary embodiment of the present disclosure.

The actual endpoints along the three-dimensional axis intersections of vectors originating at a first image focal points terminating at the line endpoints of the first image with the plane determined in the second image are calculated. The true three-dimensional axis of the bone fragment in the common device of reference is the vector constructed using these two endpoints, as shown in FIG. 13.

This can be repeated for each bone fragment artifact in each of the images resulting a plurality of three-dimensional axes in the common device of reference. Characterization of angulations and offsets between the plurality of axes can be accomplished using endpoints and the axes themselves. However, if it is desired to also characterize rotation about the plurality of axes a clinical observation of rotation may be required.

To characterize the axial rotation between a pair of axes Z1 and Z2, a plane may be created using the Z1 axis as a normal vector in combination with a Z1 axis endpoint to use as the origin O1. A first axis emanating from the first origin may be constructed on the first plane to serve as rotation reference. A second axis emanating from the first origin may be constructed and rotated relative to the first axis in the plane that corresponds to the observed rotation sighted down the Z1 axis. A second plane may be then created using the Z2 axis as a normal vector in combination with a Z2 axis endpoint to use as the origin 02. The first and second axes on the first plane are then projected along the Z1 axis onto the second plane, as shown in FIG. 13. The rotation angle may be then calculated between the first and second projected axes lying in the second plane, which represents the actual rotation.

Those having ordinary skill in the art will recognize that aspects of the present invention may be embodied in system(s), method(s) and/or computer program product(s). In some embodiments, aspects of the present invention may be embodied entirely in hardware, entirely in software (for instance in firmware, resident software, micro-code, etc.), or in a combination of software and hardware aspects that may all generally be referred to herein as a "system" and include circuit(s) and/or module(s).

Figure 15:
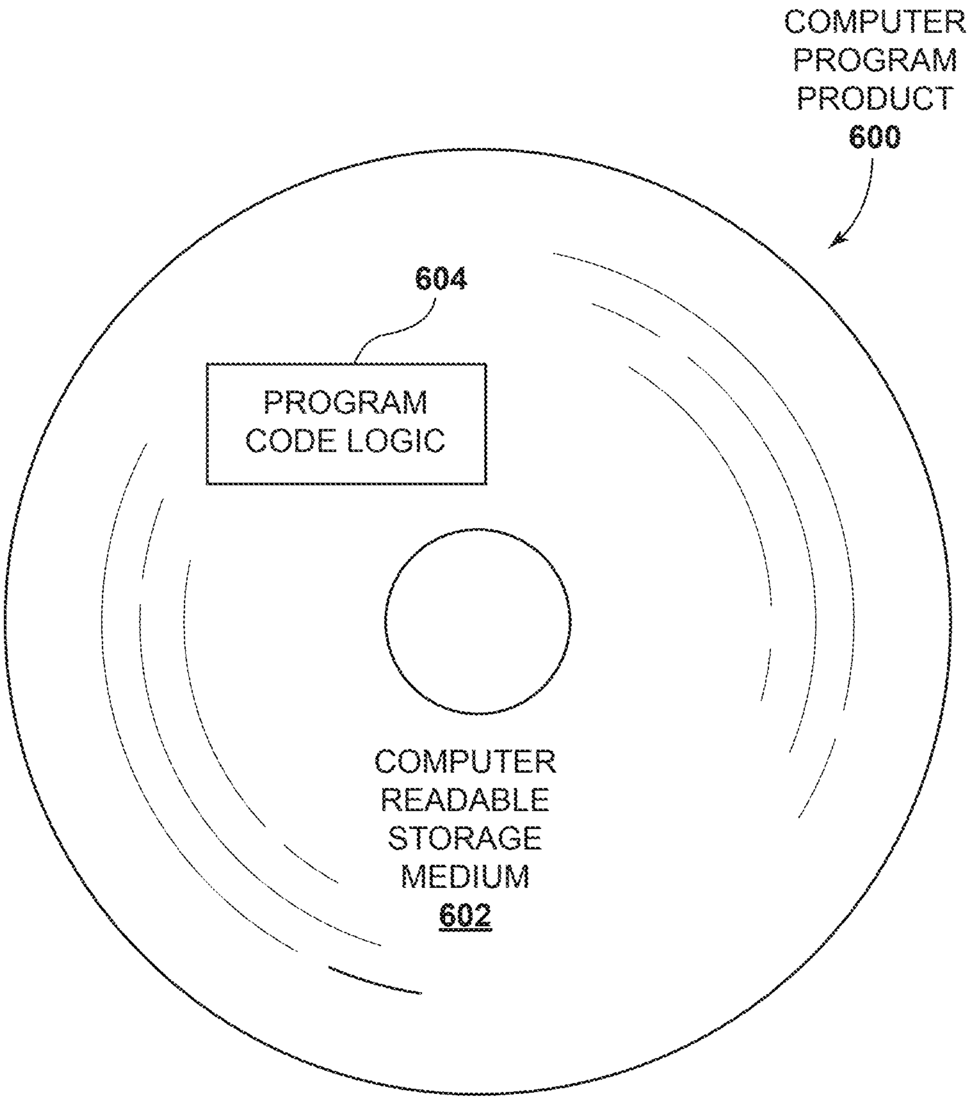
FIG. 15 depicts an embodiment of a computer program product that may incorporate of the present disclosure.

FIG. 2 depicts one example of a computer system to incorporate and use one or more aspects of the present invention. Computer system 500 of FIG. 15 may be suitable for storing and/or executing program code, such as program code for performing processes described above and includes at least one processor 502 coupled directly or indirectly to memory 505 through, a bus 520. In operation, processor(s) 502 may obtain from memory 505 instructions for execution by the processor(s). Memory 505 may include local memory employed during actual execution of the program code, bulk storage, and cache memories which provide temporary storage of at least some program code in order to reduce the number of times code must be retrieved from bulk storage during program code execution. A non-limiting list of examples of memory 505 includes a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 505 may include an operating system 505 and one or more computer programs 506, such as one or more programs for execution to perform aspects described herein, such as effecting adjustments to a digital layout of a circuit design.

Input/Output (I/O) devices 512, 515 (such as peripheral devices) may be coupled to the system either directly or through I/O controllers 510. Network adapters 508 may also be coupled to the system to enable the computer system to become coupled to other computer systems through intervening private or public networks. Modems, cable modem and Ethernet cards are just a few of the currently available types of network adapters 508. In one example, network adapters 508 facilitate obtaining data from remote sources to facilitate aspects of the present invention.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 505 and executed by a processor 502.

The computer system 500 may include fewer components than illustrated, additional components not illustrated herein, or some combination of the components illustrated and additional components. Computer system 500 may include any computing device, such as a mainframe, server, personal computer, workstation, laptop, handheld computer, smartphone, table, or other mobile device, telephony device, network appliance, virtualization device, storage controller, etc.

In addition, processes described above may be performed by multiple computer systems 500, working in concert as part of a computing environment.

In some embodiments, aspects of the present invention may take the form of a computer program product embodied in computer readable medium(s). The computer readable medium(s) may have embodied thereon computer readable program code. Various computer readable medium(s) or combinations thereof may be utilized. For instance, the computer readable medium(s) may include a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to include a tangible medium that can contain or store program code for use by or in connection with an instruction execution system, apparatus, or device, such as a processor. The program code stored in/on the computer readable medium therefore produces an article of manufacture (such as a "computer program product") including program code.

Referring now to FIG. 3, in one example, a computer program product 600) includes, for instance, one or more computer readable media 602 to store computer readable program code means or logic 604 thereon to provide and facilitate one or more aspects of the present invention.

Program code contained or stored in/on a computer readable medium can be obtained and executed by a computer system (computer, computer system, etc. including a component thereof) and/or other devices to cause the computer system, component thereof, and/or other device to behave/function in a particular manner. The program code can be transmitted using any appropriate medium, including (but not limited to) wireless, wireline, optical fiber, and/or radio-frequency, Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more computer system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which includes one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

The terminology used herein is for the purpose of describing particular embodiments only and is not intended to be limiting of the invention. As used herein, the singular forms "a". "an" and "the" are intended to include the plural forms as well, unless the context clearly indicates otherwise. It will be further understood that the terms “comprise” (and any form of comprise, such as “comprises” and “comprising”). “have” (and any form of have, such as “has” and “having”). “include” (and any form of include, such as “includes” and “including”), “contain” (and any form contain, such as “contains” and “containing”), and any other grammatical variant thereof, are open-ended linking verbs. As a result, a method or article that “comprises”, “has”. “includes” or “contains” one or more steps or elements possesses those one or more steps or elements, but is not limited to possessing only those one or more steps or elements. Likewise, a step of a method or an element of an article that “comprises”. “has”. “includes” or “contains” one or more features possesses those one or more features, but is not limited to possessing only those one or more features.

As used herein, the terms “comprising.” “has.” “including.” “containing.” and other grammatical variants thereof encompass the terms “consisting of” and “consisting essentially of”

The phrase “consisting essentially of” or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed compositions or methods.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

I claim:

1. A method of constructing a transform that registers a two-dimensional (2D) image and a three-dimensional (3D) device depicted in the first image, comprising:

obtaining a digital 2D first image depicting a 3D device that has at least four non-coplanar identifiable fiducial artifacts;

rotating the first image about an axis normal to the plane of the first image such that a reference artifact of the device depicted in the first image is oriented horizontal in an image plane;

obtaining physical parameters of the device;

creating a 3D mathematical device model of at least the fiducial artifacts of the device based on the physical parameters of the device;

defining a bounded area of interest on the first image that contains the fiducial artifacts;

identifying artifact depictions of the fiducial artifacts within the bounded area of interest in the first image, and assigning a reference label to each of the artifact depictions;

determining a plurality of metrics characterizing a position and a trajectory of the artifact depictions within the bounded area of interest in the first image;

generating the 3D mathematical device model of the device in image space between the first image and a selected focal point in the image space;

determining a best fit of a pitch, a spin and x-y-z positions of the 3D mathematical device model as compared to the device depicted in the first image; and determining a best x-y-z position of the focal point as compared to the device depicted in the first image, and, based thereon, constructing a transform that registers the first image and the device.

2. The method of claim 1, wherein determining a best pitch and spin of the 3D mathematical device model as compared to the device depicted in the first image comprises iteratively adjusting the pitch and spin of the 3D mathematical device model and determining corresponding positions of depictions of the fiducials thereof in the image space.

3. The method of claim 2, further comprising determining pitch and spin iterations which produce fiducial depictions that have the plurality of metrics that most closely matches the determined metrics of the fiducials in the first image.

4. The method of claim 3, further comprising determining a reference label correlation of the fiducials of the 3D mathematical device model that has the plurality of metrics that most closely matches the determined metrics of the fiducials in the first image.

5. The method of claim 4, wherein determining best x and y positions of the 3D mathematical device model as compared to the device depicted in the first image comprises, in the determined best pitch and spin determinations and with the determined best reference label correlation, iteratively adjusting the horizontal (x) and vertical (y) position of the 3D mathematical device model and determine a horizontal and vertical position with fiducial depictions that has the plurality of metrics that most closely matches the determined metrics of the fiducials in the first image.

6. The method of claim 5, wherein determining the best z positions of the 3D mathematical device model and the focal point as compared to the device depicted in the first image, comprises, in the determined best pitch and spin and x-y position determinations and with the determined best reference label correlation, iteratively adjusting the height of the 3D mathematical device model and the focal point with respect to the image plane to scale the depictions of the fiducials of the 3D mathematical device model in the image plane that best matches that of the fiducials in the first image.

7. The method of claim 6, wherein determining the best x and y positions of the 3D mathematical device model and the focal point as compared to the device depicted in the first image, comprises, in the determined best pitch and spin and x-y-z position determinations, best z position of the focal point determination, and with the determined best reference label correlation, moving the 3D mathematical device model and focal point in x and y directions to best superimpose the 3D mathematical device model depictions of the fiducials with the fiducial depictions in the first image.

8. The method of claim 1, wherein the creating the 3D mathematical device model comprises creating a mapping of the 3D locations of the fiducials of the device in a reference artifact coordinate system of the device.

9. The method of claim 8, wherein the mapping comprises an indication of the sizes of the fiducials.

10. The method of claim 8, wherein the mapping comprises a point cloud.

11. The method of claim 1, wherein the plurality of metrics utilize a common aspect of the bounded area of interest in the first image to identify the position trajectory of each of the identified fiducial depictions.

12. The method of claim 1, wherein the generating the 3D mathematical device model of the device in image space between the first image and a selected focal point in image space includes scaling the device model to the identified fiducial depictions.

13. The method of claim 12, wherein the generating the 3D mathematical device model of the device in image space between the first image and a selected focal point in image space further includes orienting the device model with no yaw or pitch.

14. The method of claim 13, wherein the generating the 3D mathematical device model of the device in image space between the first image and a selected focal point in image space further includes orienting the 3D mathematical device model with an approximated roll/spin based on viewpoint information of the first image and an approximated focal point.

15. The method of claim 1, further comprising constructing a transform that registers a second two-dimensional (2D) image and the three-dimensional (3D) device depicted in the second image, comprising:

obtaining a digital 2D second image depicting the 3D device that has at least four non-coplanar identifiable fiducial artifacts;

rotating the second image about an axis normal to the plane of the second image such that a reference artifact of the device depicted in the second image is oriented horizontal in the image plane;

defining a bounded area of interest on the second image that defines an area that contains the fiducial artifacts;

identifying second artifact depictions of the fiducial artifacts within the bounded area of interest in the second image, and assigning a second reference label to each of the second artifact depictions;

determining a plurality of metrics characterizing a position and a trajectory of the second artifact depictions within the bounded area of interest in the second image;

creating a second mathematical device model of the device in image space between the second image and a selected focal point in image space;

determining a best fit of a pitch, a spin and x-y-z positions of the second mathematical device model as compared to the device depicted in the second image; and determining a best x-y-z position of the focal point as compared to the device depicted in the second image, and, based thereon, constructing a transform that registers the second image and the device.

16. The method of claim 1, wherein the device is an external fixation device.

17. The method of claim 16, wherein the device is a superior or inferior bone or tissue fixation platform.

18. A system comprising:

a memory;

at least one processor in communication with the memory; and program instructions executable by one or more processors via the memory, wherein the one or more processors are configured to:

access a digital 2D first image depicting a 3D device that has at least four non-coplanar identifiable fiducial artifacts;

rotate the first image about an axis normal to the plane of the first image such that a reference artifact of the device depicted in the first image is oriented horizontal in an image plane of the first image;

access physical parameters of the 3D device;

create a 3D mathematical device model in response to the physical parameters of at least the fiducial artifacts of the device;

define a bounded area of interest on the first image that contains the fiducial artifacts;

identify artifact depictions of the fiducial artifacts within the bounded area of interest in the first image, and assign a reference label to each of the artifact depictions;

determine a plurality of metrics characterizing a position and a trajectory of the artifact depictions within the bounded area of interest in the first image;

generate the 3D mathematical device model in image space between the first image and a selected focal point in image space;

determining a best fit of a pitch, a spin and x-y-z positions of the 3D mathematical device model as compared to the device depicted in the first image; and determine a best fit of the x-y-z position of the focal point as compared to the device depicted in the first image, and, based thereon, construct a transform that registers the first image and the device.

* * * * *